United States Patent [19]

Sumiyoshi et al.

[11] 3,710,648
[45] Jan. 16, 1973

[54] AUTOMATIC TRANSMISSION

[75] Inventors: Masaharu Sumiyoshi, Toyota; Shigeru Sakakibara, Aichi; Osamu Ito, Toyota; Hisato Wakamatsu, Kariya, all of Japan

[73] Assignees: Toyota Jidosha Kogyo Kabushiki Kaisha, Toyota-shi; Nippondenso Kabushiki Kaisha, Aichi-ken, Japan

[22] Filed: June 16, 1970

[21] Appl. No.: 46,589

[30] Foreign Application Priority Data

June 24, 1969 Japan..................44/49796

[52] U.S. Cl...................................74/731
[51] Int. Cl..................F16h 47/08, F16h 5/42
[58] Field of Search..................74/731, 645, 365

[56] References Cited

UNITED STATES PATENTS

| | | | |
|---|---|---|---|
| 3,572,168 | 3/1971 | Shirai et al. | 74/752 |
| 2,373,453 | 4/1945 | Brunken | 74/731 |
| 2,529,129 | 11/1950 | Blair | 74/731 |
| 2,952,346 | 9/1960 | Costa et al. | 74/365 X |
| 3,007,351 | 11/1961 | Hilpert | 74/731 X |
| 3,354,744 | 11/1967 | Kuhnle et al. | 74/645 |
| 3,420,328 | 1/1969 | Johnson et al. | 74/731 X |

Primary Examiner—Milton Kaufman
Assistant Examiner—Thomas C. Perry
Attorney—Cushman, Darby & Cushman

[57] ABSTRACT

An automatic transmission comprising a transmission means having a torque converter and a gear transmission mechanism of at least two stages; electrical means for generating a shifting signal in accordance with the engine speed, the vehicle speed and the torque converter slip ratio; and hydraulic means operated in accordance with said shifting signal of said electrical means for selecting either of the two stages of said gear transmission mechanism.

12 Claims, 20 Drawing Figures

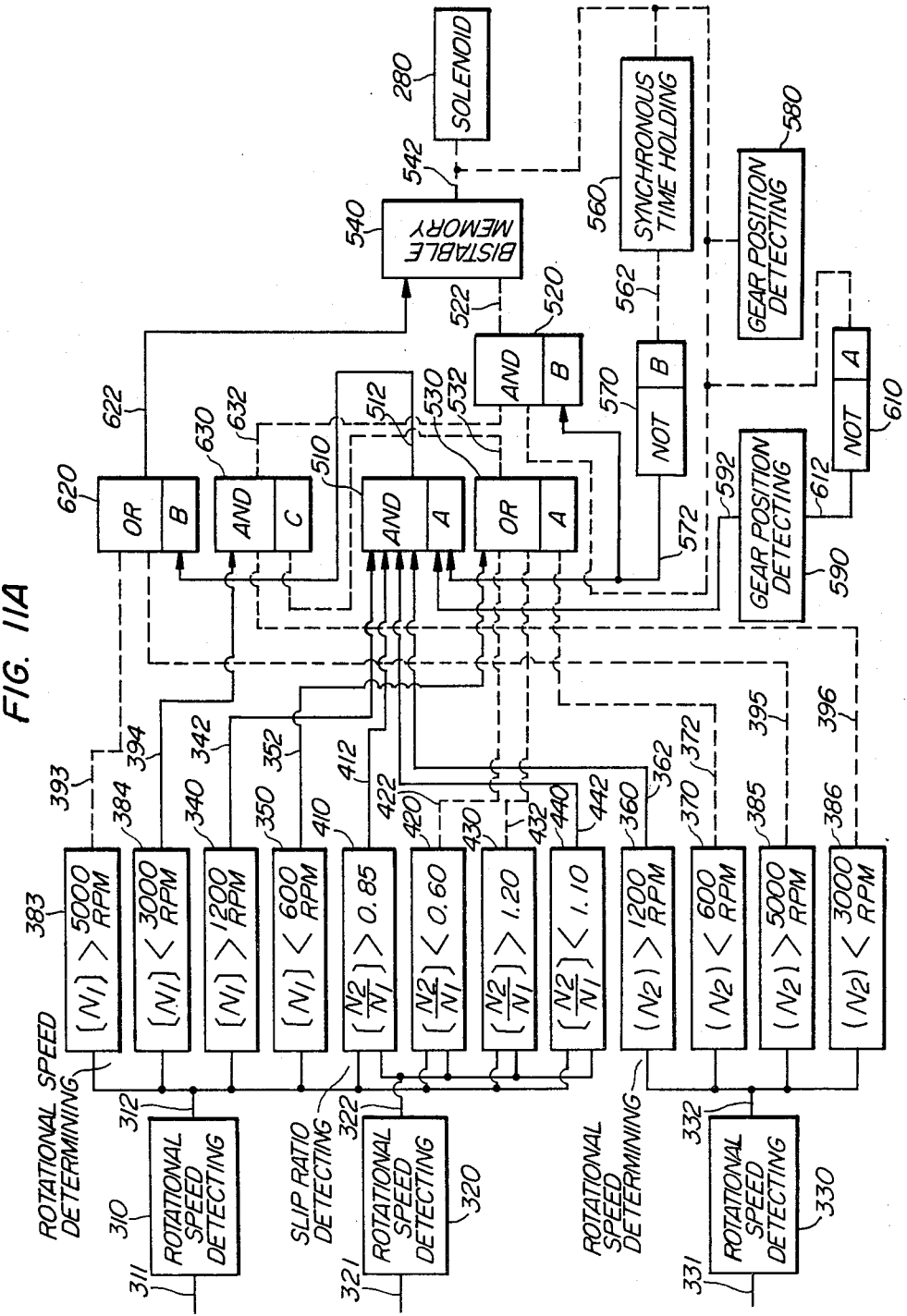

AUTOMATIC TRANSMISSION

BACKGROUND OF THE INVENTION

1. Field of the Invention:

The present invention relates to an automatic transmission for an automobile, and more particularly to an automatic transmission having a hydraulic torque converter (hereinafter simply referred to as "torque converter"), a multi-stage gear transmission and a hydraulic control circuit.

2. Description of the Prior Art:

In a conventional automatic transmission of a type generally used in an automobile, a signal representing a vehicle speed which may be derived from an output shaft of the multi-stage gear transmission mechanism, and a signal representing either the intake suction pressure or boost pressure of a prime mover of an internal combustion engine, or the position of a throttle actuating pedal which may be operated by a driver are used for determining the point of gear shift. These signals are represented as the changes in hydraulic pressure, and the difference of the pressure representing said two signals is detected to determine the point of gear shift whereby valve means is actuated to selectively apply a hydraulic line pressure to one or more of hydraulic actuators for multi-disc clutch means and/or band brake means. According to this known system, since the operation is fully controlled through hydraulic pressure, an accurate control cannot be expected due to the existence of error signals which are often included in the hydraulic pressure representing the detected signals. Thus, the point of gear shift cannot be determined with a sufficient accuracy. Further, since the hydraulic circuit is generally complicated, it is quite difficult to provide more improved functions than the currently provided functions. For example, in a conventional automatic transmission, when a vehicle is climbing with a relatively high speed and if it is desired to rapidly shift down the gear train into a low gear stage, a possible way would be to release the pressure applied on the throttle pedal. However, the response to this operation would be that the gear train would be initially shifted up to a higher gear stage and then shifted down to a desired position. Moreover, when the throttle pedal is depressed in order to shift the gear train into a high gear stage, the initial response would a shifting down to a lower gear stage. Further, when a vehicle is descending a slope with a relatively high speed, although the application of engine brake is desirable, the transmission will be automatically shifted to a higher gear stage. Thus, since a desirable shifting to a lower gear stage cannot be expected, the operator will have to manually control the transmission.

These disadvantages are basically caused by the fact that the shift point is determined only by the load condition of the internal combustion engine and the vehicle speed and that the internal condition of the transmission is not taken into account.

Further, in a conventional transmission, since no means is provided for shifting the gear train into a higher gear stage only when the engine is running at a speed lower than the maximum allowable speed, the engine life is adversely affected. Still further, despite the fact that it is not desirable to operate a vehicle with such a speed that exceeds the vehicle performance, the conventional transmission has no means for preventing such an operation when the gear train is shifted from a lower gear stage to a higher gear stage, so that the life of car is undesirably shortened.

SUMMARY OF THE INVENTION

The transmission in accordance with the present invention is characterized in that the amount of slip in a torque converter of the transmission is utilized as a main factor for determining the point of gear shifting, an electronic circuit being provided for generating through its operation a command signal which is most suitable to the shifting condition and thereafter moving an actuator through a hydraulic circuit to perform a shifting operation. Thus, according to the present invention, the transmission can be operated with the most suitable gear train when a vehicle is descending a slope applying an engine brake as well as during a normal operation. Further, the structure of a hydraulic system for operating the actuator can be simplified, so that any functional error due to fluctuation of a hydraulic pressure can be effectively prevented. Thus, the present invention provides a transmission which is more accurate and has a higher performance. Further, according to the present invention, there is provided a transmission in which the vehicle speed and the engine speed are limited so that the gear train is shifted from a lower gear stage to a higher gear stage before the engine speed and the vehicle speed exceed the maximum allowable limit.

The present invention will now be described with reference to preferred embodiments illustrated in the accompanying drawings.

DESCRIPTION OF THE PREFERRED EMBODIMENTS

Figure 1:
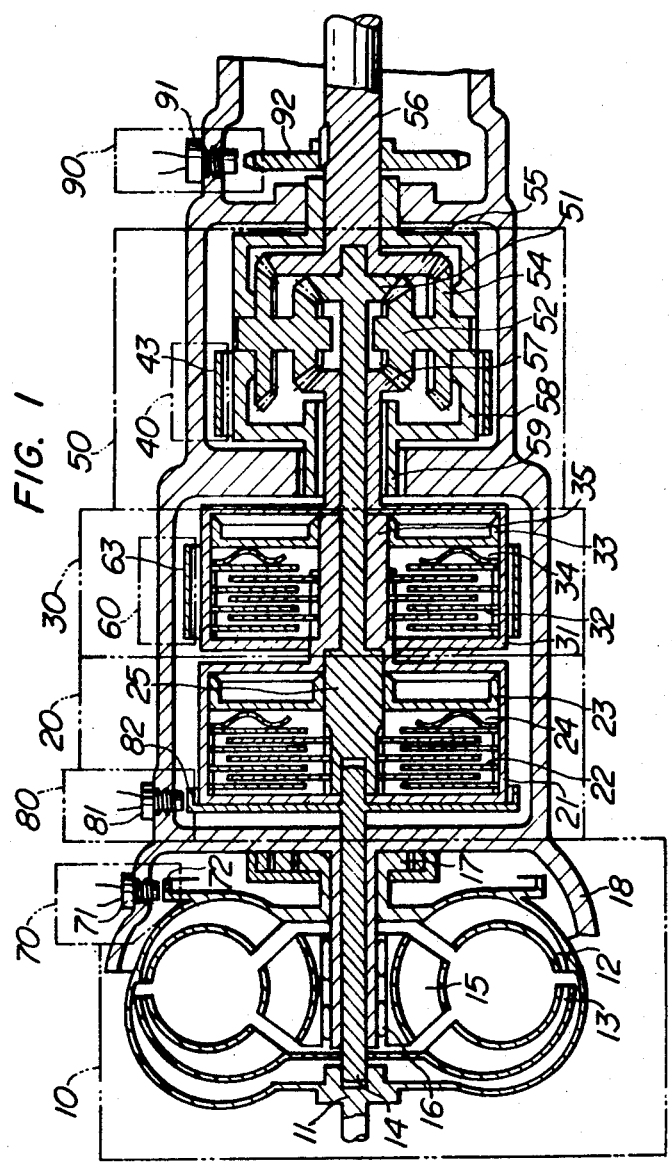
FIG. 1 is a sectional view of a transmission in accordance with the present invention.

I. Arrangements of a Two-forward Stage Automatic Transmission:

The present invention will now be described with a typical example embodied in a two-forward stage automatic transmission having a torque converter as shown in FIG. 1.

It should of course be understood that the present invention is in no way limited to a tow-forward stage transmission, but can also be embodied in an automatic transmission having gear trains of three stages or more. The illustrated automatic transmission comprises a torque converter generally designated by the reference numeral 10, a front clutch 20, a rear clutch 30, a rear brake 40 and a gear train 50.

The input section of the torque converter 10 comprises a pump shaft 11 directly connected to an output shaft of an appropriate internal combustion engine (not shown), the shaft 11 having a torque converter pump 12 integrally secured thereto. The torque converter further comprises a turbine 13 opposed to the torque converter pump 12 and a stator 15 disposed between the pump 12 and the turbine 13 and having a one-way clutch 16. The construction and the function of the torque converter are well known in the art, so that its operation will not be described in detail but merely explained that the pump 12 serves to produce a circulation flow and the turbine 13 is rotated under the momentum of the circulation flow, the rotation of the turbine being in turn transmitted to a turbine shaft 14 secured to the turbine.

Thus, a rotation is transmitted from the torque converter pump to the turbine with a certain speed difference or a certain slip ratio. When the speed difference is small, the torque being transmitted is also small, while when the speed difference is large, the torque being transmitted becomes large. Thus, the torque converter can transmit a rotation with a varying torque. The speed difference referred to above may alternatively be identified by a speed ratio or a slip ratio.

A hydraulic pump 17 is connected to the torque converter pump shaft 11 for the purpose which will be described later with reference to a gear pump. The front clutch 20 comprises a clutch drum 21 integrally connected to the turbine shaft 14, a multi-disc clutch 22, a clutch piston 23, a plate spring 24, and a clutch shaft 25, and when a hydraulic pressure is applied to the clutch 20, the shaft 14 and 25 are brought into engagement with each other.

The rear clutch 30 comprises a clutch shaft 35 integrally connected to the clutch drum 21, a clutch drum 31, a multi-disc clutch 32, a clutch piston 33, and a plate spring 34, and on application of a hydraulic pressure, the drums 21 and 31 are brought into engagement with each other.

Figure 2:
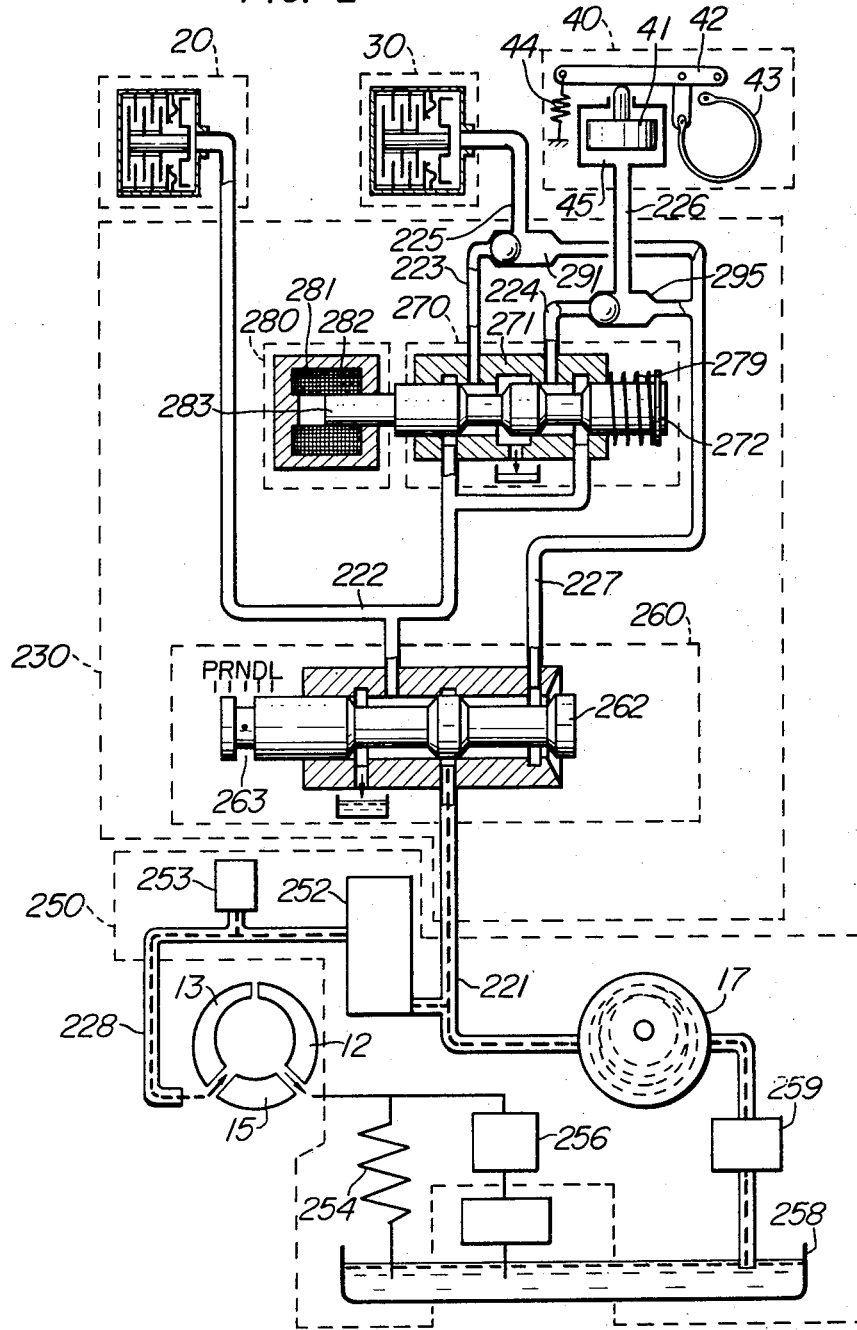
FIG. 2 is a circuit diagram of a hydraulic system suitable for use with a two-forward stage automatic transmission in accordance with the present invention.

The rear brake 40 comprises, as shown in FIG. 2, a brake piston 41, a brake link 42, a brake band 43, a return spring 44 and a brake cylinder 45, and upon application of a hydraulic pressure, the brake band 43 is actuated into engagement with a carrier 58 of the gear train 50 so that the carrier becomes stationary with respect to a housing 18.

The constructions of the clutches and the brake are the same as those of known mechanism. The gear train 50 comprises, for example, a first sun gear 51, a second sun gear 57, a third sun gear 55, a first planetary gear 52, a second planetary gear 54, an output shaft 56 and the afore-mentioned carrier 58. The first and the second sun gears 51 and 57 mesh with the first planetary gear 52, and the second planetary gear 54 which is integral with the first planetary gear 52 meshes with the third sun gear 55. Thus, the gears constitute a planetary bevel gear mechanism. The planetary bevel gear mechanism has the following operational positions.

High gear position: When the front clutch 20 and the rear clutch 30 engage, the first and the second sun gears 51 and 57 are rotated at the same speed and the carrier 58 is released for free rotation, whereby the rotation of said first and second sun gears is directly transmitted to the output shaft. Thus, the rotation is transmitted at a speed ratio of 1 : 1.

Low gear position: Upon engagement of the front clutch 20 and the rear brake 40, the input torque is applied to the first sun gear 51 and the carrier 58 is held against rotation by the rear brake 40, while the second sun gear 57 is released for free rotation, so that the output shaft is rotated at a speed equal to $1/k$ of the input speed; where $k$ is the gear ratio.

Reverse position: Upon engagement of the rear clutch 30 and the rear brake 40, the input rotation is applied to the second sun gear 57, while the first sun gear 51 is released for free rotation. Further, since the carrier 58 is held against rotation by the rear brake 40, the output shaft 56 is caused to rotate in the reverse direction at a speed equal to $1/k$ of the input speed.

II. Rotational Speed Detector

A speed detector 70 for the torque converter shaft comprises a detector 71 secured to the housing 18 and a toothed wheel 72 secured to the torque converter pump. The speed detector 71 produces electric signal $S_1$ equal in number to the rotational speed $N_1$ of the torque converter pump 12 times the number of teeth $n_1$ of the wheel 72. Since the output shaft of the internal combustion engine is integrally connected with the shaft 11, the produced electrical signal exactly corresponds to the engine speed. A speed detector 80 for the torque converter turbine shaft comprises a rotational speed detector 81 which may be identical to the detector 71 and secured to the housing 18, and a toothed wheel 82 which may be identical to the wheel 72. The wheel 82 is secured to the front clutch drum 21 which is integral with the torque converter turbine shaft 14. Thus, the detector 81 produces an electrical signal $S_2$ equal in number to the rotational speed $N_2$ of the shaft 14 times the number of teeth $n_2$ of the wheel 82.

The rotational speed of the turbine shaft 14 may be detected at any part to which the rotation of the shaft 14 is transmitted. For example, the rotational speed of the output shaft may be detected by using a speed detector 90 in lieu of the detector 80 and thereafter calculated to obtain the speed of the turbine shaft.

The output shaft speed detector 90 comprises a rotational speed detector 90 secured to the housing 18 and a toothed wheel 92 integrally connected to the output shaft 56. The detector 91 may be identical in construction to the detector 71 and 81 and produces an electrical signal $S_3$ which is equal in number to the rotational speed $N_3$ of the output shaft times the number of the teeth $n_3$ of the wheel 92.

Assuming that the gear ratio is $k$, the relationship between the signals $S_2$ and $S_3$ is expressed by the following equation:

$$S_2 = k(n_2)/(n_3)S_3$$

or $$S_3 = (n_3)/(n_2 k)S_2$$

where; $k = N_2/N_3$ (gear ratio)

Thus, it should be noted that the turbine shaft speed $N_2$ can be calculated from the output shaft speed $N_3$ in accordance with the above equation.

It is further to be understood that the output shaft speed $N_3$ represents the actual running condition of the vehicle and the pump shaft speed $N_1$ represents the actual speed of the engine. Further, by detecting the torque converter turbine shaft speed $N_2$, the speed ratio between the pump shaft 11 and the turbine shaft 14 can be known. Said speed ratio represents the slip ratio of the torque converter, so that the operational condition of the torque converter can be detected from the speed ratio.

Figure 5:
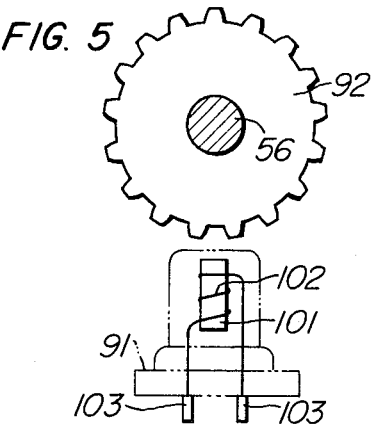
FIG. 5 is a diagrammatical view of a rotational speed detector.

The structure of the output shaft speed detector 90 will now be described taking reference to FIG. 5 as a typical example of said speed detectors. The toothed wheel 92 is constituted by a circular plate of magnetic material secured at its center to the output shaft 56 and has a certain number of teeth e.g. seventeen teeth formed at its periphery. The speed detector 91 secured to the housing 18 is located diametrically outwardly of and adjacent to the wheel 92. The speed detector 91 comprises a permanent magnet 101 and a coil 102 wound around the magnet 101. The magnet 101 and the coil 102 are coused in a casing by means of which they are mounted on the transmission housing so that an end of the magnet 101 is located adjacent to the outer periphery of the toothed wheel 92. As the wheel 92 rotates, the successive teeth of the wheel cross the magnetic field of the magnet 101 one after another, so that the magnetic leakage flux of the permanent magnet 101 is varied producing an electrical power in the coil 102. In the illustrated embodiment, one complete rotation of the wheel 92 will produce seventeen voltage signals. In general, when a toothed wheel 92 having teeth number of $n_3$ is notated at a speed of $N_3$ revolution per unit time, an alternate current signal having a frequency of $S_3 = n_3 \times N_3$ will be produced. In the drawing, the reference numeral 102 shows output terminals of the detector 91.

The toothed wheel 72 or 82 of the pump shaft speed detector 70 or the turbine shaft speed detector 80 may have a peripheral configuration as that of the wheel 92, however, each of them may be secured to the turbine of the torque converter or the clutch drum in a different manner. The output signals $S_1$, $S_2$ and $S_3$ from the speed detectors 70, 80 and 90 are respectively directed to lead wires 311, 321 and 331.

As will be described later, the present invention senses each of said rotational speeds in the form of electrical signals and thereafter calculates each rotational speed and speed ratio from the signals to produce a command signal in accordance with a predetermined control pattern. The command signal is introduced into a hydraulic circuit 230 so as to selectively control the gear train 50.

III. Hydraulic Circuit

The hydraulic circuit is shown in FIG. 2 and generally comprises a hydraulic power source 250 and a control circuit 230. The control circuit 230 includes a manual control valve 260, a selector valve 270, a solenoid 280, check valves 291 and 295 and oil lines connecting these components. The hydraulic power source 250 comprises a hydraulic pump 17, an oil filter 259, an oil pan 258, a pressure regulating valve 256, a pressure control valve 252, a relief valve 253 and an oil cooler 254 and serves to supply torque converter oil, gear lubricating oil and the pressurized oil for the hydraulic circuit. These components and the arrangements are well known in the art, so that a further description will be omitted. The manual control valve 260 comprises a valve spool 262 and a valve housing 261, and the valve spool 262 is arranged so as to be actuated by a control lever disposed in the operater's cabine (not shown). The control lever is movable to either of the parking position P, the reverse position R, the neutral position N, the drive position D and the low gear position L so as to displace the valve spool to either of the positions corresponding to said five positions. In FIG. 2, the positions of the valve spool 262 corresponding to said positions of the control valve are shown by reference characters P, R, N, D and L respectively. A groove 263 at the left end of the valve spool 262 is provided for engagement with a link member connecting the control lever to the valve spool 262.

As shown in FIG. 2, when the manual control valve 260 is at the position N, an oil passage 221 is closed and oil passages 222 and 227 are opened. When the valve 260 is displaced to the position L, the oil passage 221 is connected to the passage 222 and the passage 227 is opened. However, in the L position, the arrangement is such that the solenoid 280 cannot be energized. In the D position of the valve 260, the oil passages 221 and 222 are connected together and the oil passage 227 is opened. In the R position, the oil passages 221 and 227 are connected together and the oil passage 222 is opened. In the P position, the oil passages 221 and 227 are closed and the oil passage 222 is opened. The shift valve 270 includes a valve housing and a valve spool 272. One end of the valve spool 272 is connected to a movable core 283 of the solenoid 280. When the solenoid 280 is de-energized, the valve spool 272 is displaced toward right by means of a spring 279 engaging the other end thereof. Thus, the oil passages 222 and 224 are connected together and the oil passage 223 is opened. When the solenoid 280 is energized, the valve spool 272 is displaced toward left whereby the oil passages 222 and 223 are connected together and the oil passage 224 is opened. The check valve 291 opens to connect the oil passage 223 to the oil passage 225 blocking the passage 227 when the passage 223 is subjected to hydraulic pressure, while closes to block the passage 223 allowing the passage to communicate with the passage 225 when the passage 227 is subjected to hydraulic pressure. The check valve 295 connects the oil passage 224 with the oil passage 226 when the passage 224 is subjected to hydraulic pressure and close the oil passage 227, while connects the oil passage 227 with the oil passage 226 and closes the oil passage 224 when the passage 227 is subjected to hydraulic pressure. In this embodiment, the valve spool 272 is described to be displaced by the solenoid 280, however, it may be actuated within the scope of the present invention by any other electric actuator which can convert the electrical signal to a mechanical displacement.

By means of said hydraulic system, the transmission can be shifted to any of the positions N, D, L, R and P.

The detail of the operation will hereinafter be described.

1. N position:

In this position, as shown in FIG. 2, the pressurized hydraulic fluid is blocked by the manual control valve 260, so that all of the actuators for the front clutch, the rear clutch and the rear brake are released and do not operate. Thus, the turbine shaft 14 of the torque converter is released for free rotation. Therefore, the vehicle is not driven.

In the drawing, heavy broken lines show the parts of the hydraulic line in which high pressure exists.

2. D position:

In this position, the transmission is operated in either of DL or DH conditions. In the DL condition, the driving torque is transmitted through a low gear stage of the gear train, while in the DH condition, the torque is transmitted through a high gear stage.

In the DL condition, the valve spool 272 of the shift valve 270 is shifted toward right, and the valve spool 262 of the manual control valve 260 is in D position, so that the pressurized hydraulic fluid is supplied to the passages 221, 222, 224 and 226 to actuate the front clutch 20, and the rear brake 40 and release the rear clutch 30. Thus, the torque is transmitted through the low gear stage.

In the DH condition, the valve spool 262 of the manual control valve 260 is placed at the D position and the valve spool 272 of the shift valve 270 is shifted toward left by the energized solenoid, so that the hydraulic pressure is supplied to the passages 221, 222, 223 and 225 to actuate the front clutch 20 and the rear clutch 30 and release the rear brake 40. Thus, the torque is transmitted through the high gear.

3. L position:

In this position, the valve spool 262 of the manual control valve 260 is placed at the L position, and the valve spool 272 of the shift valve 270 is shifted toward right. Thus, the hydraulic oil pressure is applied to actuate the front clutch 20 and the rear brake 40. The rear clutch 30 is released. Thus, the torque is transmitted through the low gear stage.

4. R position:

In this position, the valve spool 262 of the manual control valve 260 is placed at the R position and the valve spool 272 of the shift valve 270 is shifted toward right. Thus, the pressurized hydraulic fluid is supplied through the oil passages 221, 227, 225 and 226 to actuate the rear clutch 30 and the rear brake 40 and to release the front clutch 20. Thus, the reverse condition is obtained.

5. P position:

The valve spool 262 of the manual control valve 260 is positioned at the P position and the valve spool 272 of the shift valve 270 is shifted toward right. Thus, the pressurized hydraulic fluid is blocked by the valve spool 262 as in the N position shown in FIG. 2, so that all of the actuators are released.

Although not shown in the drawing, there is provided a parking means which is actuated in response to the movement of the manual control valve 260 at the P position. The parking means serves, as well known in the art, to mechanically lock the output shaft 56. In the D position, the gear train through which the torque is transmitted is automatically selected through the energization or de-energization of the solenoid 280.

Therefore, the shifting zone in which the energization or de-energization of the solenoid is effected at the shifting point will now be described. III. Shifting Zone According to the present invention, the shifting point desired for the vehicle is determined by the speed $N_1$ of the torque converter pump shaft which represents the operating condition of the engine, the slip ratio of the torque converter which represents the operational condition of the torque converter and the speed $N_3$ of the output shaft which represents the running condition of the vehicle.

1. Limits by the engine speed;

1.1. Limit by the engine speed at the low engine speed range;

Since an internal combustion engine cannot be operated smoothly at a speed lower than a certain value, it is not desirable to shift the gear train from a lower gear to a higher gear at a speed lower than a certain value. In other words, such shifting of the gear train must be performed at a speed above the lower limit of the engine speed. Thus, the shifting zone is limited above a particular engine speed. In down shifting the gear train from a high gear to a low gear, it is desirable to reduce the engine speed as low as possible. Thus, the shifting zone is limited below a particular maximum limit of the engine speed.

1.2. Limit by the engine speed at the high engine speed range;

In general, an internal combustion engine produces noise and vibration at its high speed range, and if the engine is operated at a speed exceeding the maximum allowable speed, the life is undesirably decreased. When the transmission is shifted from a lower gear to a higher gear, the shifting must be performed at an engine speed lower than a particular maximum speed. Otherwise, the life of the engine will be undesirably decreased. Thus, the shifting zone is limited to the particular engine speed. This means that the shifting zone has an upper limit which is determined by the performance of the engine.

Conversely, when the transmission is shifted down from a higher gear to a lower gear, it is desirable to perform the shifting operation at a higher speed. Thus, the shifting zone has a lower limit which is determined by the performance of the engine.

2. Limit by the vehicle speed;

2.1. Limit by the vehicle speed at a lower speed range;

In a vehicle, particularly in an automobile, it is not desirable to shift the transmission from a lower gear to a high gear at an excessively lower speed because, in such a condition, the control of acceleration or deceleration cannot be performed effectively. Thus, the shifting zone is limited in this case to a vehicle speed which is not excessively low. This means that the shifting zone has a lower limit which is determined by the vehicle performance.

Conversely, when it is desired to shift down the transmission from a higher gear to a low gear, the higher gear should preferably be used until the lowermost possible speed is reached because the low gear will cause excessive noise and vibration.

Thus, the shifting zone is limited below a vehicle speed which is not excessively high. This means that the shifting zone has an upper limit which is determined by the vehicle performance.

2.2. Limit by the vehicle speed at the higher speed range;

When the vehicle is running at a high speed and when the transmission is to be shifted from a lower gear to a high gear, it is not desirable to allow the vehicle to run with a speed exceeding the vehicle performance. This means that the shifting zone has an upper limit of vehicle speed which is determined by the vehicle performance. Further, when the transmission is to be shifted down from a higher gear to a low gear, it is desirable to perform the shifting operation at the highest possible vehicle speed in order to improve the acceleration performance. This means that the shifting zone has a lower limit which is determined by the vehicle performance.

3. Limit by the slip ratio;

The power transmission performance of the torque converter substantially varies between the operating conditions where the slip ratio $N_2/N_1$ is near one or less and where it is over one. In the former case, the torque is transmitted from the internal combustion engine to the output shaft 56, while in the latter case, the output shaft 56 drives the engine. Each of the cases will now be described.

3.1. In a normal running or climbing, the power from the engine is transmitted through the torque converter to the output shaft 56. In order to fully utilize the performance of the torque converter, it is desirable that a shifting from a lower gear to a high gear is performed at the range where the slip ratio is about one. This range of slip ratio includes the ratio of 0.5 through 1.00 and, in the example shown in FIG. 3A, the slip ratio is selected to 0.85. Conversely, in order to fully utilize the performance of the torque converter when the transmission is shifted down from a higher gear to a low gear, it is desirable to use the higher gear until a slip ratio becomes lower than the aforementioned value. In this instance, the shifting zone is limited to a slip ratio lower than a predetermined value determined by the performance of the torque converter. This means that the shifting zone has an upper limit of slip ratio which is determined by the performance of the torque converter. This upper limit is usually 0.9 and, in the example shown in FIG. 3B, this value is selected to 0.60.

3.2. The torque is transmitted from the output shaft 56 to the engine (1) during deceleration and (2) when the vehicle is descending along a gentle slope.

When the vehicle is descending a slope and when it is desired to gently accelerate the vehicle, it will be required to shift the transmission from a lower gear to a high gear. In this instance, it is desirable to perform the shifting operation at a slip ratio near one. Thus, the shifting zone is limited to a slip ratio within a range near 1.00 which range is determined by the performance of the torque converter. This range is usually 0.9 through 1.3 and, in the example shown in FIG. 3A, it is selected to 1.10.

When it is desired to apply a strong braking effort or sudden desceleration, or when it is desired to apply a braking effort during descending a slope, it will be required to shift down the transmission from a high gear to a low gear. In this case, the slip ratio has a tendency to become higher than 1.00. Thus, it is usually required to perform the shifting operation before the slip ratio becomes excessively high, so that an effective engine brake is utilized. Therefore, the shifting zone is limited below a slip ratio of predetermined value which is determined by the performance of the torque converter. In other words, the shifting zone has an upper limit of slip ratio which is determined by the performance of the torque converter. The value of the upper limit is 1.00 and, in the example shown in FIG. 3B, the value is selected to 1.20.

As described above, the factors for determining the shifting point from a lower gear to a high gear include the speed of the engine, the vehicle speed, the slip ratio when the torque is transmitted from the engine to the output shaft 56, and the slip ratio when the torque is transmitted from the output shaft 56 to the engine. When all of the limit of these factors is exceeded, the transmission is shifted to a high gear. The factors for determining the shifting point from a higher gear to a low gear also include the speed of the engine, the vehicle speed, the slip ratio when the torque is transmitted from the engine to the output shaft 56, and the slip ratio when the torque is transmitted from the output shaft 56 to the engine. When any of the limits of the factors is exceeded, the transmission is shifted down to a low gear. The four factors in the latter case are independent from each other, and when any of the limits of these factors is exceeded, shifting operation is performed.

In the above description, it has been explained that the vehicle speed is detected as the rotational speed $N_3$ of the output shaft 56 to determine the shifting point, however, if this is culculated to an equivalent value of the turbine shaft speed $N_2$ as previously referred to, all of the factors can be shown on the same plane. Therefore, in the foregoing description, the vehicle speed will be represented by the turbine shaft speed $N_2$.

The limits of the factors for determining the shifting point have thus been explained, however, in the actual operation, the most suitable shifting point (or line) is selected in accordance with the performances of the internal combustion engine and the torque converter so that the shifting is performed at the most suitable point within said limits.

With respect to a gasoline engine car, this can be expressed by a diagram as shown in FIG. 3.

Figure 3A:
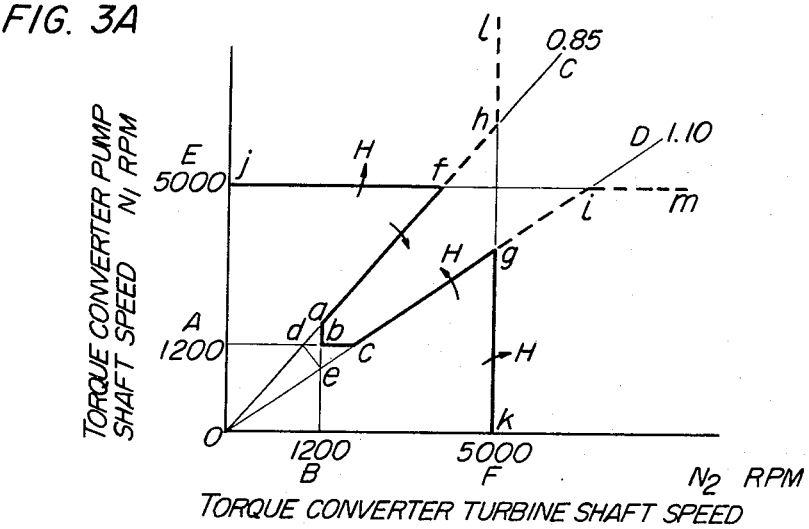
FIGS. 3 A, B and C are diagrams showing examples of shifting zone.

I. In FIG. 3A, the shifting zone for shifting from a lower gear to a high gear is shown by the lines A, B, C, D, E and F and this zone corresponds to the following conditions:

Torque converter pump shaft speed (engine speed); 1200 RPM (const.)

The speed of the output shaft 56 (this corresponds to the vehicle speed and is converted into the revolution $N_2$ of the turbine shaft); 1,200 RPM (const.)

The slip ratio when the torque is transmitted from the engine to the output shaft 56; 0.85 (const.)

The slip ratio when the torque is transmitted from the output shaft 56 to the engine; 1.10 (const.)

The torque conveter pump shaft speed (engine speed); 5000 RPM (const.)

The torque converter turbine shaft speed (the speed of the output shaft 56) (this represents the vehicle speed and is converted into the revolutions $N_2$ of the turbine shaft speed); 5000 RPM (const.)

In performing the shifting, the above values determine the shifting lines (or points) and, when these values are exceeded and the operating condition comes into the shifting zone, the shifting is performed. Thus, when the operating condition comes out of the zone encircled by the solid line j-f-a-b-c-g-k-o as shown by the arrows H, the shifting is performed.

In some instances and in accordance with the performances of the vehicle and the engine, it may be desirable to perform the shifting when the operational condition comes out of the zone encircled by the line l-h-d-c-g-k-o, l-h-a-e-g-k-o, j-f-d-c-g-k-o, j-f-a-e-3-k-o, o-j-f-d-c-i-m, or o-j-f-a-e-i-m.

Further, in accordance with the present invention, the shifting may be performed when the operational condition comes into the zone encircled by the line a-d-e-c.

Figure 3B:
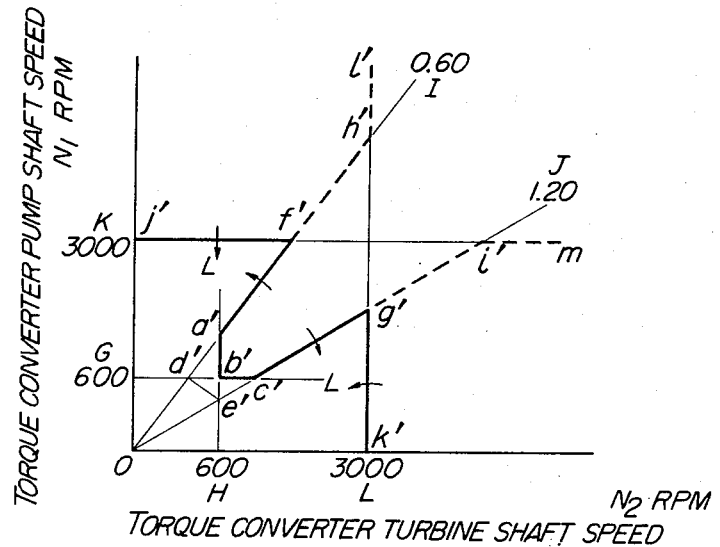

II. In FIG. 3B, the shifting zone for shifting down from a higher gear to a low gear is shown by the lines G, H, I, J, K and L and this zone corresponds to the following conditions:

The torque converter pump shaft speed (engine speed); 600 RPM (const.)

The output shaft speed (this represents the vehicle speed and is converted into the productions $N_2$ of turbine shaft); 600 RPM (const.)

The slip ratio when the torque is transmitted from the engine to the output shaft 56; 0.60 (const.)

The slip ratio when the torque is transmitted from the output shaft 56 to the engine; 1.20 (const.)

The torque converter shaft speed (engine speed); 3,000 RPM (const.)

The output shaft speed (this represents the vehicle speed and is converted into the revolutions $N_2$ of turbine shaft); 3,000 RPM (const.)

In performing the shifting, these values determine the shifting lines (or points) and, when these values are exceeded, the shifting is performed. In other words, the shifting is performed when the operating condition comes into the zone encircled by the line j'-f'-a'-b'-c'-g'-k'-o as shown by the arrows L.

In some instances and in accordance with the performances of the vehicle and the engine, it may be desirable to perform the shifting when the operating condition comes into a zone encircled by a line l'-h'-d'-c'- g'-k'-o, l'-h'-a'-e'-g'-k'-o, j'-f'-d'-e'-g'-k'-o, j'-f'-a'-e'-g'-k'-o, o-j'-f'-d'-c'-i'-m', or o-j'-f'-a'-e'-i-m'.

Further, it is also within the scope of the present invention to perform the shifting when the operating condition comes out of the zone encircled by the line a'-d'-e'-c'.

Figure 3C:
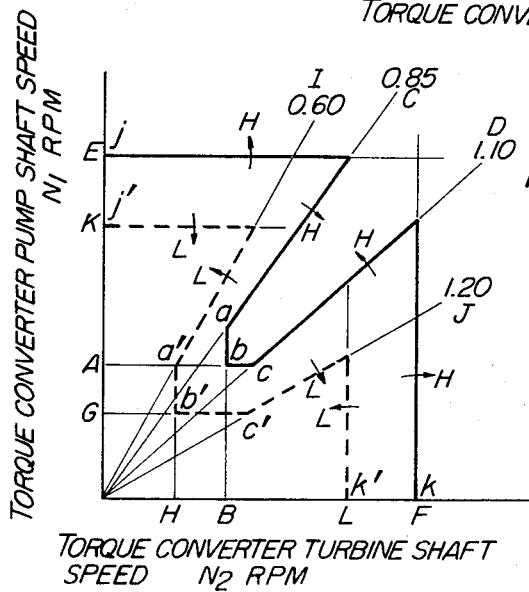

In FIG. 3C, the shifting points (or lines) from the lower gear to the high gear are shown by solid lines and those from the higher gear to the low gear are shown by broken lines.

In this example, as shown in FIGS. 3A and 3B, the shifting points (or lines) are represented by the straight lines, however, in some cases, they may be represented by curves and such cases will of course be within the scope of the present invention.

An embodiment of the operational circuit for producing an electrical signal for initiating the shifting in accordance with the shifting points (or lines) shown in FIGS. 3A and 3B will now be described.

Figure 4:
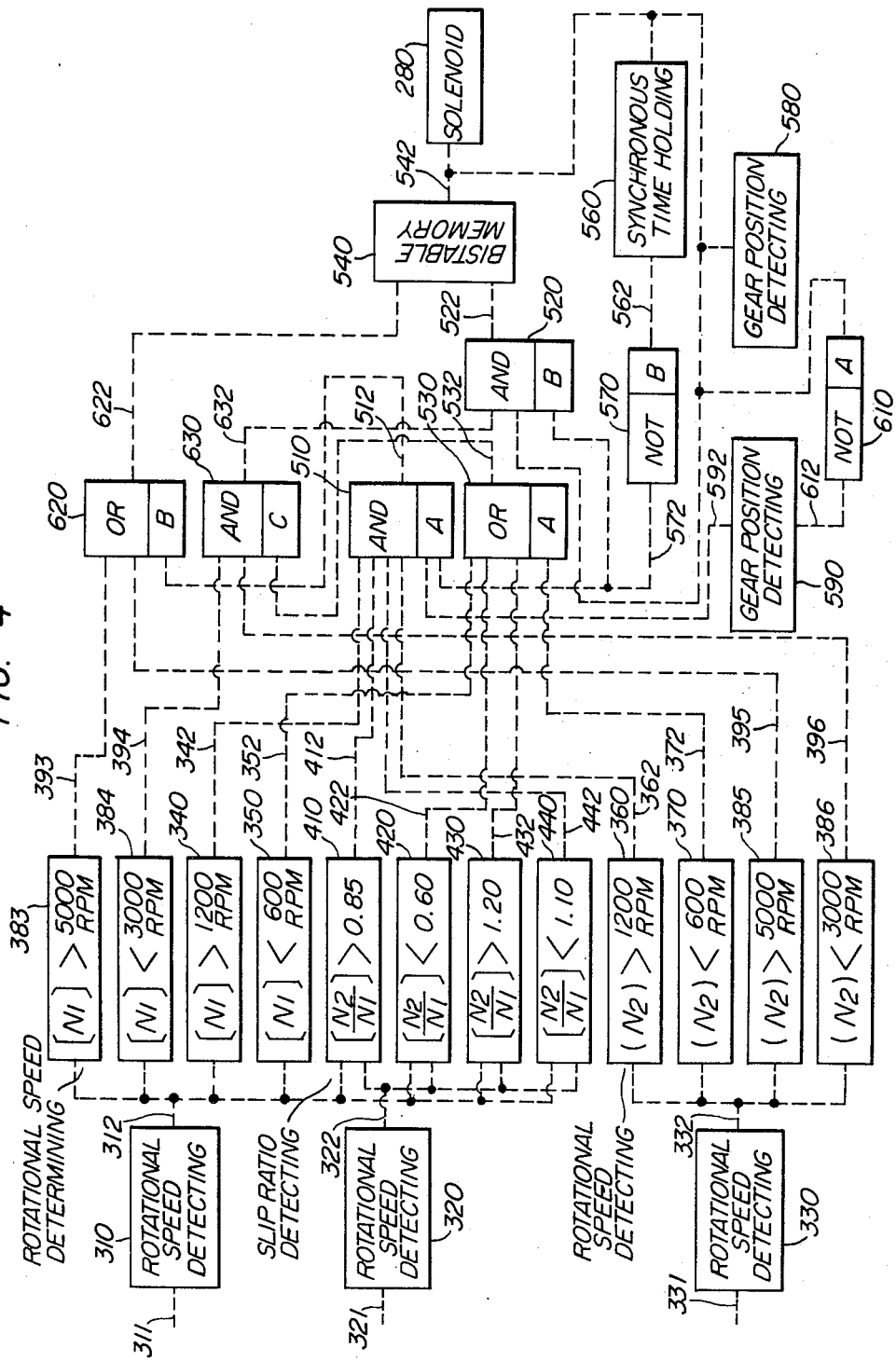
FIG. 4 is a block diagram of an electronic operational circuit.

V. Operational Circuit:

The operational circuit for determining the shifting points (or lines) comprises, as shown in FIG. 4, rotational speed detecting circuits 310, 320 and 330 for the torque converter pump shaft, the torque converter turbine shaft and the output shaft; four slip detecting circuits 410, 420, 430 and 440; eight rotational speed determining circuits 340, 350, 360, 370, 383, 384, 385 and 386; three AND circuits 510, 520 and 630; two OR circuits 530 and 620; a bi-stable memory circuit 540; a synchronous time holding circuit 560; two NOT circuits 570 and 610; and two gear position detectors 580 and 590.

In the foregoing description, unless otherwise specified, the word "signal" will mean a positive direct voltage with the negative side grounded.

These components will now be described.

When the control lever is placed in the D position, the operational circuit is connected with power source by means of a switch (not shown) so that it is placed to a position in which it can perform an operation.

The components shown in FIG. 4 will now be described.

The input of the torque converter pump shaft speed detecting circuit 310 is the output voltage $S_1$ of the pump shaft speed detector 70. This output signal is introduced through a line 311. The output of the circuit 310 is an electrical signal $[N_1]$ representing the pump shaft speed. This signal is led out through a line 312. Hereinafter, the electrical signals representing speeds will be identified by the same references with the addition of [ ]. [

The input of the torque converter turbine shaft speed detecting circuit 320 is the output voltage $S_2$ of the turbine shaft speed detector 80 introduced through the line 321. The output of the circuit 320 is an electrical signal $[N_2]$ representing the turbine shaft speed and is led out through a line 322.

The input of the output shaft speed detecting circuit 330 is the output voltage $S_3$ of the output shaft speed detector 90 and introduced through the line 331. The output is an electrical signal $[N_3]$ and is led out of the circuit through a line 332.

The input of the speed determining circuit 340 for use at the speed range exceeding 1,200 RPM is the signal $[N_1]$ introduced through a line 312 and its output is an electrical signal showing that the speed $N_1$ is above 1200 RPM and is passed through a line 342.

Similarly, the rotational speed determining circuit 350 for use at the speed range below 600 RPM and the rotational speed determining circuit 360 for use at the speed range exceeding 1,200 RPM, the rotational speed determining circuit 370 for use at the speed range below 600 RPM, the rotational speed determining circuit 383 for use at the speed range exceeding 5,000 RPM, and the rotational speed determining circuit 384 for use at the speed range below 3,000 RPM, the rotational speed determining circuit 385 for use at the speed range exceeding 5,000 RPM and the rotational speed determining circuit 386 for use at the speed range below 3,000 RPM respectively have the inputs $[N_1]$, $[N_3]$, $[N_3]$, $[N_1]$, $[N_1]$, $[N_3]$ and $[N_3]$ which are respectively introduced through the lines 312, 332, 332, 312, 312, 332 and 332, and also have the outputs which are passed through the lines 352, 362, 372, 393, 394, 395 and 396. (In this instance, the signal $[N_3]$ is circulated to obtain the signal $N_2$ which represents the torque converter turbine shaft speed.)

The slip ratio detecting circuit 410 for use at the range $[(N_2)/(N_1) > 0.85]$ has the inputs $[N_1]$ and $[N_2]$ which are respectively introduced through the lines 312 and 322. Further, its output is a signal (voltage) representing the results of the operation $([(N_2)/(N_1)] > 0.85)$ and is passed through a line 412.

Similarly, the inputs of the slip ratio detecting circuits 420, 430 and 440 are the signal voltages $[N_1]$ and $[N_2]$ introduced from the lines 312 and 322. Their output signals represent the results of the operation $([(N_2)/(N_1)] < 0.60)$, $([(N_2)/(N_1)] > 1.20)$ and $([(N_2)/(N_1)] < 1.10)$ and are passed through the lines 422, 432 and 442.

The inputs of the AND circuit A510 are the output signals of the speed determining circuit 340, the slip ratio detecting circuit 410, the slip ratio detecting circuit 440 and the speed determining circuit 360, the signal from the gear position detector 590 and the signal from the NOT circuit B570, and are introduced through the lines 342, 412, 442, 362, 592 and 572. Its output is a voltage signal representing the results of operation and passed through the line 512.

The inputs of AND circuit B520 are the signals introduced through the lines 632, 542 and 572 and its output voltage signal is passed through the line 522. The inputs of the AND circuit C630 are the signals introduced through the lines 394, 396 and 532, and its output voltage signal is passed through the line 632.

The inputs of the OR circuit A530 are the voltage signals introduced through the lines 352, 422, 432 and 372, and its output voltage signal is passed through the line 532. The inputs of the OR circuit B620 are the signals introduced through the lines 393, 395 and 512, and its output voltage signal is passed through the line 622.

The inputs of the bi-stable memory circuit 540 are the voltage signals introduced through the lines 622 and 522, and its output voltage signal is passed through the line 542.

The input of the synchronous time holding circuit 560 is the voltage signal introduced through the line 542, and its output voltage signal is passed through the line 562.

The input of the NOT circuit A610 is the signal voltage introduced through the line 542, and its output voltage signal is passed through the line 612.

The input of the NOT circuit B570 is the voltage signal introduced through the line 562, and its output voltage signal is passed through the line 572.

The input signal voltage of the high gear position circuit 580 is introduced through the line 542.

The input signal voltage of the low gear position circuit 590 is introduced through the line 612, and the output voltage signal is passed through the line 592.

The line 542 is connected to the solenoid 280, and the output signal of the bi-stable memory circuit 540 is introduced through the line 542 into the solenoid 280.

Figure 6:
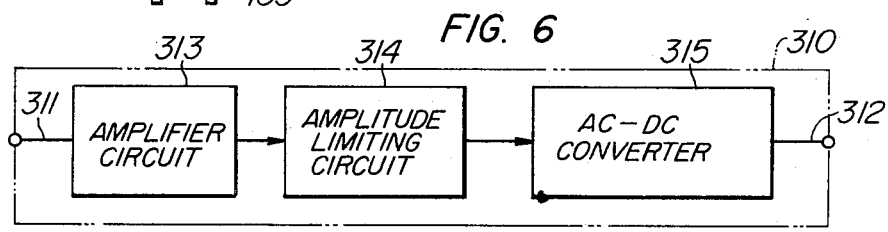
FIG. 6 is a block diagram showing a rotational speed detecting circuit.

VI. Components of the Operational Circuit:

1. Rotational speed detecting circuits;

The torque converter pump shaft speed detecting circuit 310, the turbine shaft speed detecting circuit 320, and the output shaft speed detecting circuit 330 receive the aforementioned voltage signals $S_1$, $S_2$ and $S_3$ and calculate the respective rotational speeds. The constructions of these circuits are substantially the same, so that they will be described with respect to the pump shaft speed detecting circuit 310 shown in FIG. 6. The input voltage signal $S_1$ is introduced through the line 311, amplified by an amplifier 313, and modified by an amplitude limiter so that its amplitude becomes constant. The modified AC voltage is transferred through a AC-DC converter 315 which may comprise a frequency detecting and rectifying circuit to a DC voltage which is proportional to the rotational speed $N_1$. The output voltage is passed through the line 312.

This means that the operation $[N_1] = k_1 \cdot N_1 = S_1/n_1$ has been performed, where $k_1$ is proportional constant.

Figure 7:
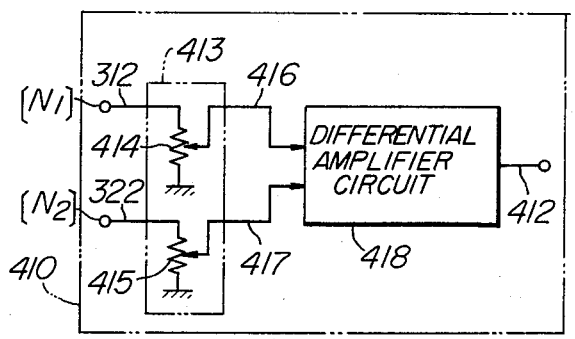
FIG. 7 is a block diagram showing a slip detecting circuit.

The frequency detecting circuit of the AC-DC convertor 315 has an adjustable timing circuit including resistors and condensors, and through the adjustment of the constant of the timing circuit, the operation of the turbine shaft speed detecting circuit 320 and the output shaft speed detecting circuit 330 ($[N_2] = k_2 \cdot N_2 = S_2/n_2$ and $[N_3] = k_3 \cdot N_3 = S_3/n_3$) can be performed. where $k_2$, $k_3$ are proportional constant 2. Slip ratio detecting circuit;

The output voltage signals $[N_1]$ and $[N_2]$ of the speed detecting circuits 310 and 320 are respectively introduced through the lines 312 and 322 into the four slip ratio detecting circuits 410, 420, 430 and 440. These four circuits are all the same in construction. Therefore, the arrangements of the slip ratio detecting circuits will be described with respect to the circuit 410 shown as a typical example in FIG. 7. The lines 312 and 322 are connected at one of their ends to the potentiometer. The other ends of the potentiometers 414 and 415 are grounded. The potentiometers have intermediate sliders 416 and 417 connected with a differential amplifier circuit 418. The output signal of the circuit 418 appears in the line 412.

The calculation of the slip ratio is an operation of $[(N_2)/(N_1)] > 0.85$ and this can be performed through operation $[N_2] < 0.85 [N_1]$ or $[N_2] - 0.85[N_1] > 0$. The potentiometer 414 is so adjusted that the signal $[N_1]$ from the line 312 is transferred to an output signal of $0.85 [N_1]$ which appears at the slider 416 and that the signal $N_2$ from the line 322 is directly transmitted to the slider 417 with the unaltered value of $[N_2]$. These two signals are introduced into the differential amplifier 418 to obtain the result of operation $[N_2] - 0.85[N_1]$. If the result value is positive, it is amplified and appears at the line 412 as a constant voltage. If the value is negative, the output signal does not appear. Thus, the output voltage shows that the operating condition is in the zone $[N_2] - 0.85[N_1] < 0$. This means that an operation $[(N_2)/(N_1) > 0.85]$ has been performed. In the zone $[(N_2)/(N_1)] < 0.85$, no output voltage appears. Conversely, when it is desired to detect the zone $[(N_2)/(N_1)] < 0.85$, the signal $[N_2]$ is applied to the line 312 and the slider 416 is directly connected to the line 312, while the signal $[N_1]$ is applied to the line 322 and the slider 417 is so adjusted that the output signal of $0.85[N_{1b}]$ is obtained.

Similarly, by suitably adjusting the potentiometer and by suitably selecting the input terminals, the operations $[(N_2)/(N_1)] > 1.20$, $[(N_2)/(N_1)] < 0.60$ and $[(N_2)/(N_1)] < 1.10$ can also be performed. The output signals of the detecting circuits appear at the lines 412, 422, 432 and 442 in the form of voltage.

3. Rotational speed determining circuits;

The rotational speed determining circuits include eight circuits 340, 350, 360, 370 383, 384, 385 and 386. These are the circuits for performing an operation to determine whether the input signal $[N_1]$ and $[N_3]$ are greater than a predetermined value or not and whether or not output signals should be produced. These eight circuits are the same in construction.

Figure 8:
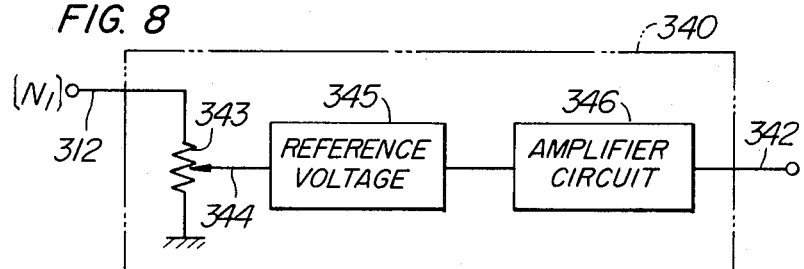
FIG. 8 is a block diagram showing a rotation determining calculation circuit.

As one example of these circuits, the circuit 340 for performing an operation $[N_1] > 1,200$ (rpm) is shown in FIG. 8.

As the input, a voltage representing the speed $[N_1]$ is introduced through the line 312 into the potentiometer 343. The slider 344 of the potentiometer 343 is connected to the reference voltage 344 which may be a fixed voltage diode that becomes conductive at a voltage above the reference voltage. The output of the reference voltage 345 is connected to an amplifier circuit 346 and the output of the circuit 346 appears in the line 342. The slider 344 is so adjusted that it can divided the $[N_1]$ voltage introduced into the potentiometer 343 into suitable values. When the voltage at the slider 344 exceeds the reference voltage 345, a signal is sent to the amplifier circuit 346 which amplifies the signal and generates a voltage. Conversely, when the reference voltage is higher than the voltage at the slider 344, no output signal appears. For example, in such a circuit that can generate a signal at the line 342 at 200 RPM when the slider 344 of the potentiometer 343 is placed to a position that it is directly connected to the line 312, if it is desired to detect $[N_1] > 1,200$ RPM, the slider 344 may be displaced from the grounded end by a distance equal to 200/1200 of the potentiometer length. Then, the output signal 342 appears at the line 342 when the speed $N_1$ exceeds 1,200 RPM. Further, in order to detect $[N_1] > 600$ RPM, the slider 344 may be displaced by a distance equal to 200/600 of the potentiometer length. Then, a signal appears at the line 342 when the speed $N_1$ exceeds 600 RPM. By providing a phase reversing circuit in the amplifier 346, a signal can be obtained at $[N_1] < 1,200$ RPM.

Thus, the conditions $N_1 < 1,200$ RPM, $N_1 < 600$ RPM $N_3 > 1,200$ RPM and $N_3 < 600$ RPM can be detected.

4. High gear position circuit 580, low gear position circuit 590, and NOT circuit A610;

As a shifting condition, it is essential to know whether the gear train of the transmission is at the low gear position or at the high gear position. For this purpose, a voltage applied to the solenoid 280 is taken out as the signal of the high gear position. When the solenoid 280 is energized, the NOT circuit A610 which is a phase reversing circuit eliminates the output voltage and generates an output signal when the solenoid 280 is de-energized. This output signal is used as the signal of the low gear position 590. Since the purpose of these position signals is to know the position of the transmission gear train, it is within the scope of the present invention to obtain an electrical signal from the hydraulic circuit or from the gear train.

5. Synchronous time holding circuit 560;

Immediately after the solenoid 280 is energized or de-energized, the hydraulic circuit and the transmission start the shifting operation and this operation continues for a short period. If another signal is introduced during this period, the shifting operation will not be completed. Therefore, it is necessary to continue the shifting operation until it is completed even when another shift signal is received.

Figure 9:
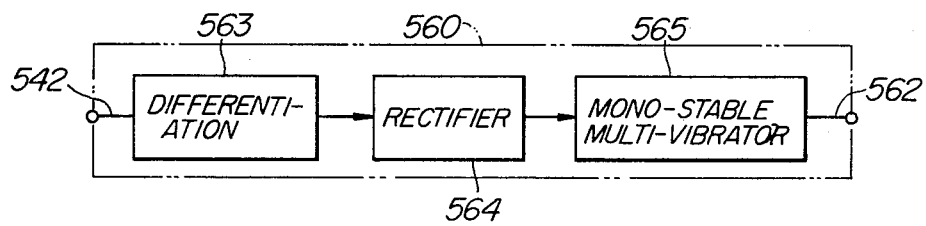
FIG. 9 is a block diagram showing a synchronous timed hold circuit.

For this purpose, the synchronous time holding circuit 560 is used. This circuit 560 comprises, as shown in FIG. 9, a differentiating circuit 563, a rectifying circuit 564 and a mono-stable multi-vibrator 565. A rectangular voltage energizing the solenoid 280 is introduced through the line 542 into the differentiating circuit 563 to the differentiated thereby, so that a signal is produced during a transient period of the energization or the de-energization. The signal is rectified by the circuit 564. This signal is utilized to activate the multi-vibrator 565 so that a signal is produced at the line 562 for a time $t$.

The signal in line 562 is reversed by the NOT circuit 570 (phase inverting circuit), so that the signal of the NOT circuit in the line 572 dissipates for the time $t$.

It is also within the scope of the present invention to obtain a time holding function by producing a signal after the solenoid is energized or de-energized and the transmission is completed its shifting movements.

6. AND circuit;

The AND circuit A510 produces a output signal at the line 512 when all of the output signals of the circuits 340, 410, 440, 370, 590 and B570 exist.

The AND circuit B520 produces a output signal at the line 522 when all of the output signals of the circuits 630, 580 and B570 exist. The AND circuit C630 produces a output signal at the line 632 when all of the output signals of the circuits 384, 386, and A530 exist.

7. OR circuit;

The OR circuit A530 produces an output voltage signal at the line 532 when either one of the output signals of the circuits 350, 420, 430 and 370 exists. The OR circuit B620 produces an output signal at the line 622 when either one of the output signals of the circuits 383, 385, and A510 exists.

Figure 10:
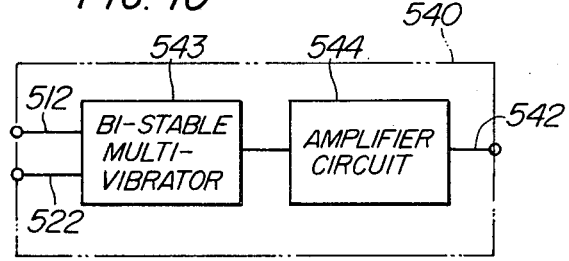
FIG. 10 is a block diagram showing a bi-stable memory circuit.

8. Bi-stable memory circuit;

This circuit is shown in FIG. 10. The lines 512 and 522 are connected to the input terminals of the bi-stable multi-vibrator 543 and, when a stepwise voltage signal appears at the line 512, the multi-vibrator takes one of the stable positions. The output of the multi-vibrator is amplified by the amplifier circuit 544 and the output of the circuit 544 is passed through the line 542 and energizes the solenoid 280. Further, when a stepwise input is applied to the line 522, the multi-vibrator 543 takes the other of the stable positions, so that the output voltage of the amplifier circuit 544 dissipates.

Once the input is applied for example to the line 512, the solenoid 280 is held in its energized position even after the input voltage dissipates.

Even when a signal is again applied to the line 512, the solenoid 280 is held in its energized condition.

VII Function of the Operational Circuit:

1. Shifting from a lower gear to a high gear;

In shifting from a lower gear to a high gear, when the running condition of the vehicle comes into the shifting zone as shown by solid line in the direction shown by arrow H in FIG. 3C, the solenoid 280 is energized whereby the valve spool 272 of the shift valve 270 is displaced toward left. Since the manual control valve 260 is in the position D, the gear train 50 is then shifted from the low gear to the high gear by means of the actuators.

In FIGS. 11A through 16, such lines in which signal voltage exist are shown by solid lines while such lines where no signal voltage exists are shown by broken lines. As shown in FIG. 11A, since the solenoid 280 is not energized until the shifting operation is initiated, the signal from the NOT circuit A610 or from the low gear position circuit 590 exists. Further, since there is no output signal from the circuit 560 there exists an output signal from the NOT circuit B570. These output signals are passed into the AND circuit A510.

Figure 11B:
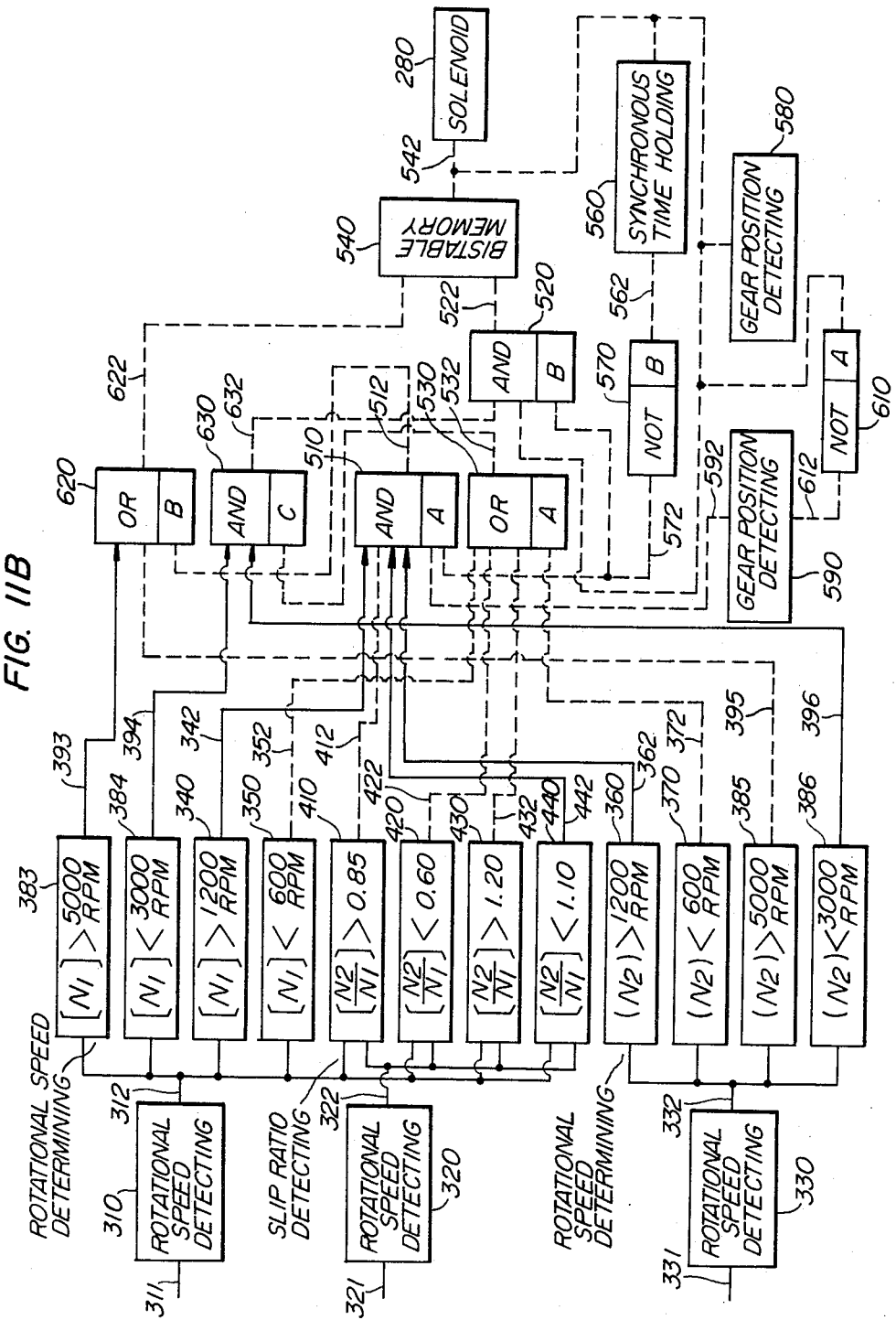
FIGS. 11 through 16 are diagrams showing the operational steps in the electronic operational circuit shown in FIG. 4; and, FIG. 17 is a diagrammatical view of a hydraulic circuit suitable for use with a three-forward stage automatic transmission in accordance with the present invention.

As the engine speed increases to a value where, a condition $[N_1] < 1,200$ RPM is reached, and the vehicle speed increases to a value where a condition $[N_2] < 1,200$ RPM, and if the slip ratio $[(N_2)/(N_1)]$ is higher than 0.85 (the slip ratio $N_2/N_1$ is of course less than 1.10 in this instance), the output signals appear in each of the operational circuits. These signals are introduced into the AND circuit A510. When the circuit A510 receives all of these signal as the inputs, it produces an output signal which is introduced into the OR circuit B620. Then, the circuit B620 immediately produces an output signal which is in turn introduced into the bi-stable memory circuit 540. Further, as shown in FIG. 11B, when a $[N_1] > 5,000$ RPM signal from the speed determining circuit 383 or a $[N_2] > 5,000$ RPM signal from the speed determining circuit 385 is introduced into the OR circuit and no output signal of the circuit A510 is introduced, an output signal appears at the OR circuit B620. The output signal of the circuit B620 is introduced into the bi-stable memory circuit 540.

When a signal is introduced into the circuit 540, the signal is memorized thereby and the solenoid 280 is energized. Thus, the shifting operation of the hydraulic circuit and the transmission is initiated.

Figure 12:
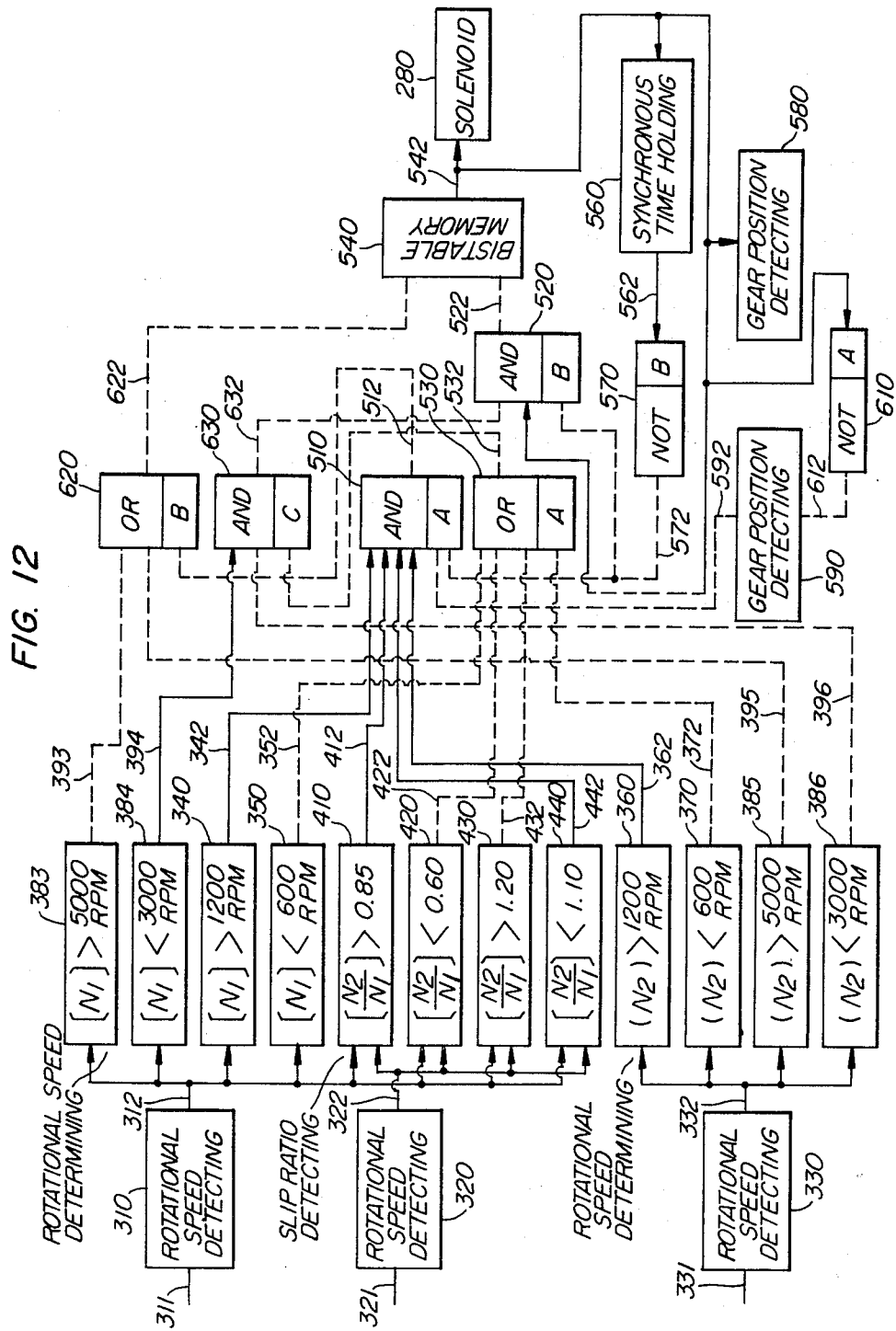

The voltage for energizing the solenoid 280 is also introduced, as shown in FIG. 12, into the synchronous time holding circuit 560 and a signal is produced for a time $t$. Thus, the signal of the NOT circuit B570 is immediately eliminated. The existence of the voltage for energizing the solenoid 280 means that there is a signal of the high gear position circuit 580. Thus, the NOT circuit A610 cancels the signal to the low gear position circuit 590.

Thus, two of the input signals of the AND circuit A510 are eliminated, the output of the AND circuit A510 disappears.

However, since the memory circuit 540 holds the given condition, the solenoid 280 is held in its energized condition.

Figure 13:
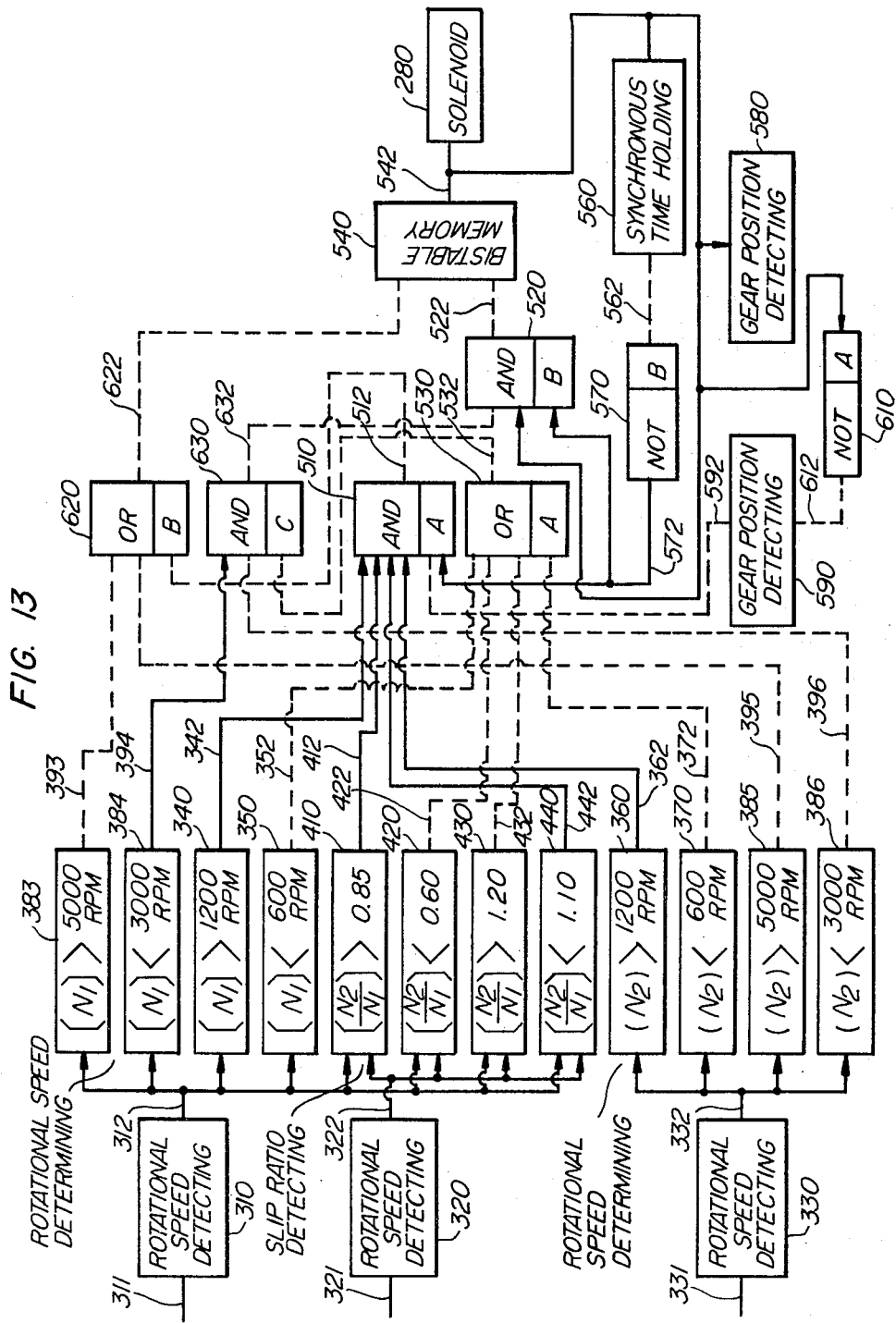

After the time t elapses, the holding signal disappears as shown in FIG. 13, so that an output signal appears at the NOT circuit B570. This output signal and the high gear signal are introduced into the AND circuit B520.

The above operation is one mode of operation when the transmission is operating with a high gear train.

2. Shifting from a higher gear to a low gear;

The shifting from a higher gear to a low gear is performed when the operating condition comes into a zone shown by dotted lines in FIG. 3C in the direction shown by the arrow L. In this instance, the solenoid 280 is de-energized and the valve spool 272 of the shift valve 270 is returned toward right. Thus, the actuators serve to shift the gear train 50 from a higher gear to a low gear.

Figure 14:
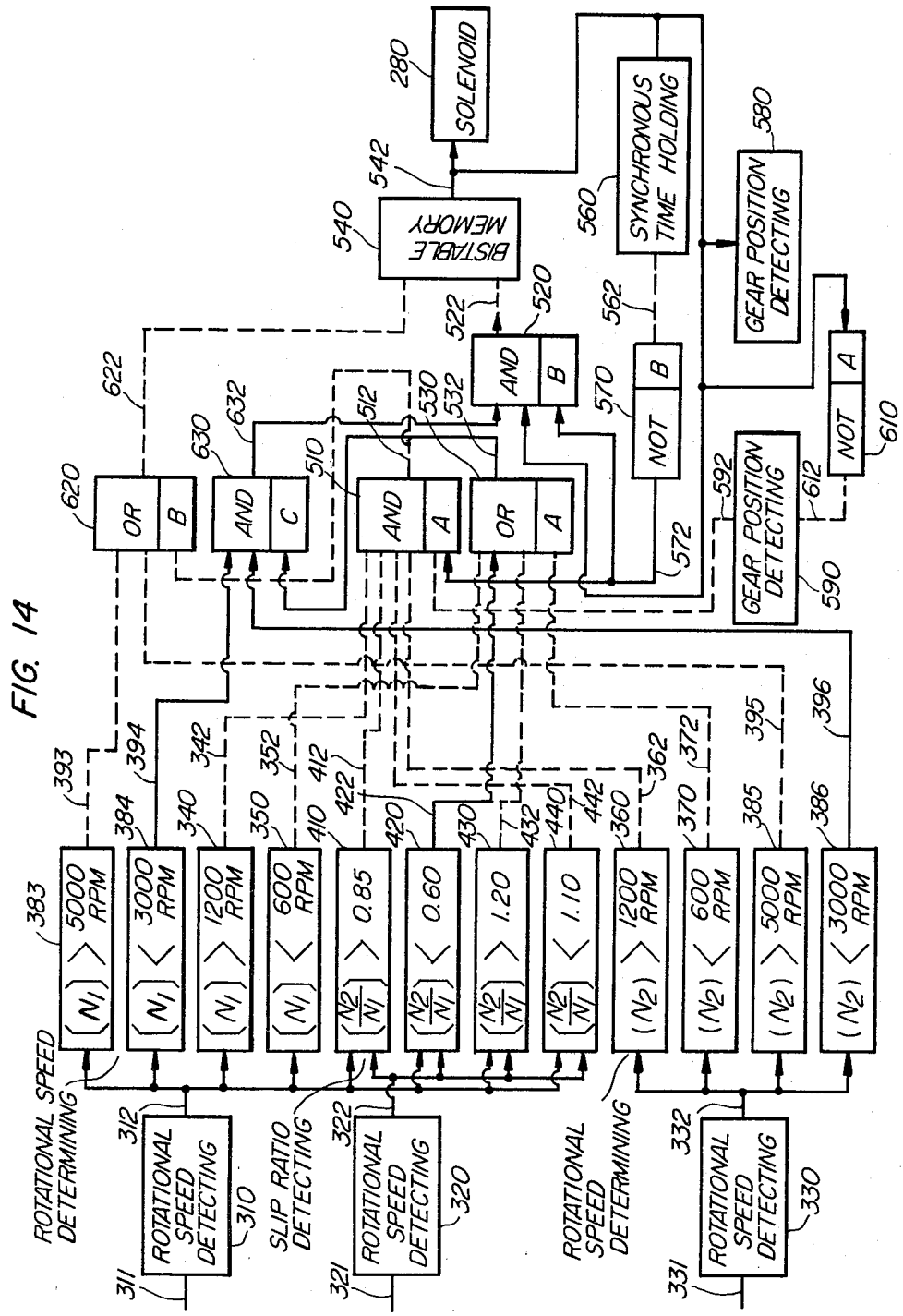

As shown in FIG. 14, before the shifting operation is initiated, when either one of the speed determining signals or the slip signals introduced into the AND circuit A510 disappears, the AND circuit A510 does not produce any output signal. However, the solenoid 280 is held in its energized position.

The AND circuit B520 is supplied with the output signals of the NOT circuit B570 and the high gear position circuit.

As the running condition of the vehicle changes and the slip ratio decreases below 0.6., the $[(N_2)/(N_1) < 0.60$ signal is produced by the slip ratio detecting circuit 420. This signal is introduced into the OR circuit A530. Thus, the OR circuit A530 applies its output signal to the AND circuit C630. Since the $[N_1] < 3,000$ RPM signal from the speed detecting circuit 384 and $[N_2] < 3,000$ RPM signal from the speed detecting circuit 380 are already introduced into the AND circuit C630, the AND circuit C630 then immediately produces an output signal which is in turn introduced into the AND circuit B520. Thus, the AND circuit B520 immediately produces an output signal.

Figure 15:
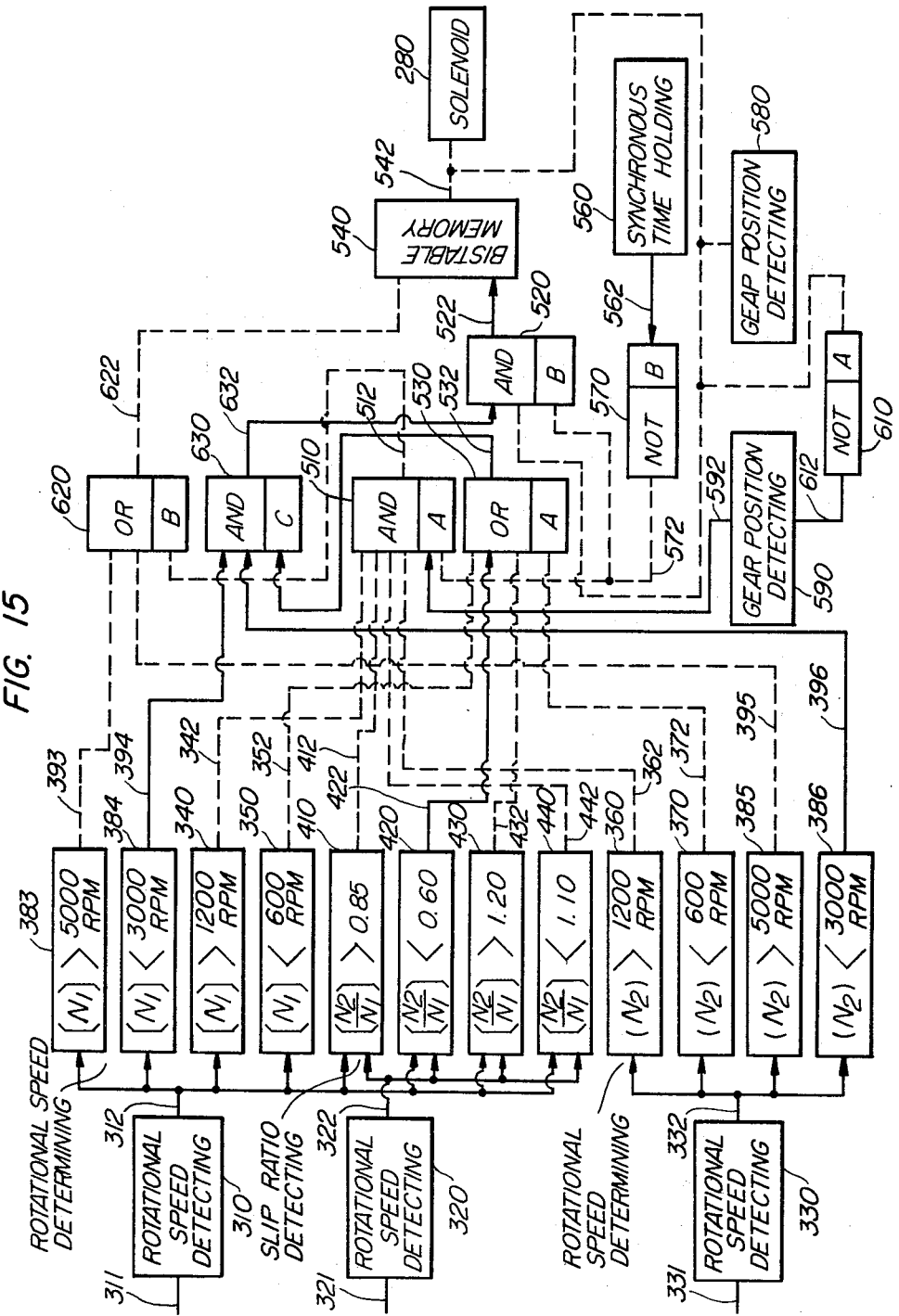
Figure 16:
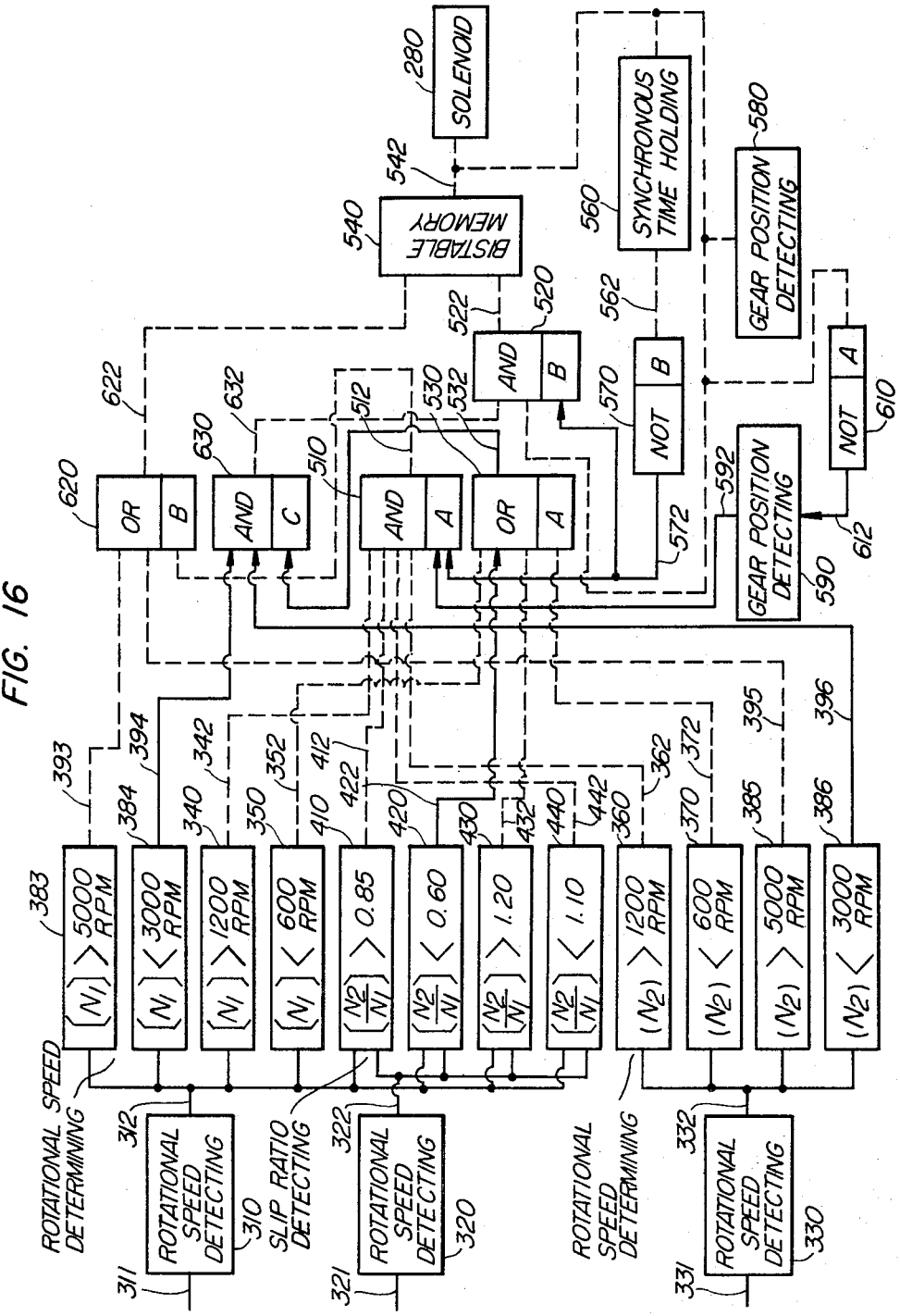

The output of the AND circuit B520 is introduced, as shown in FIG. 15, through the line 522 into the bi-stable memory circuit 540, whereby the circuit 540 is switched into the other stable position so that the solenoid 280 is de-energized and thus the shifting is initiated. Then, the synchronous time holding circuit 560 produces a timed signal whereby the output of the NOT circuit B570 disappears from the line 572. At the same time, since the high gear position signal disappears, the output signal of the AND circuit B520 also disappears. After the lapse of the time $t$, the signal of the circuit 560 disappears and, as shown in FIG. 16, the signals from the NOT circuit B570 and the low gear position circuit 590 are introduced into the AND circuit A510. This is one mode in which the transmission operates with a low gear.

In FIGS. 14, 15 and 16, the lines for passing the $[N_1] > 1,200$ RPM signal and the $[N_2] > 1,200$ RPM signal are shown by thin broken lines, however, since they take no part in the above operation, they will not be described in detail.

The above description relates to an operation when a $[(N_2)/(N_1) < 0.60$ signal of the slip detecting circuit 420 appears, however, when other signals appears, such as in the slip detecting circuit 430 or either of the speed detecting circuits 350 and 370, the signal is introduced into the OR circuit A530 and an operation similar to that described with reference to FIGS. 14, 15 and 16 can be performed. Thus, the shifting from a high gear to a low gear is performed.

The present invention has thus been described with reference to a two-stage gear transmission, however, it can also be applied to a transmission having a gear train of three or more stages. In the latter case, the slip ratio of the torque converter and the speeds of the engine and the vehicle are similarly calculated and the results of the calculation is used to control the energization of the solenoid. One or more shift valves similar to the valve 270 are provided in combination with one or more solenoids similar to the solenoid 280. Thus, by actuating the shift valves, the shifting to the first, second and third gears can effectively be controlled.

VIII Hydraulic Circuit for a Three-stage Transmission:

In the transmission shown in FIG. 1, a front brake 60 may be provided on the clutch drum 31 of the rear clutch 30 to provide a three-stage transmission. The combination of the front clutch 20, the rear clutch 30, the rear brake 40 and the front brake 60 will provide a three-stage gear train as shown in the following table.

|  | Front clutch 20 | Rear clutch 30 | Front brake 60 | Rear brake 40 |
|---|---|---|---|---|
| Reverse |  | Engage |  | Engage. |
| Forward: |  |  |  |  |
| 1st | Engage |  |  | Do. |
| 2nd | do |  | Engage |  |
| 3rd | do | Engage |  |  |

Figure 17:
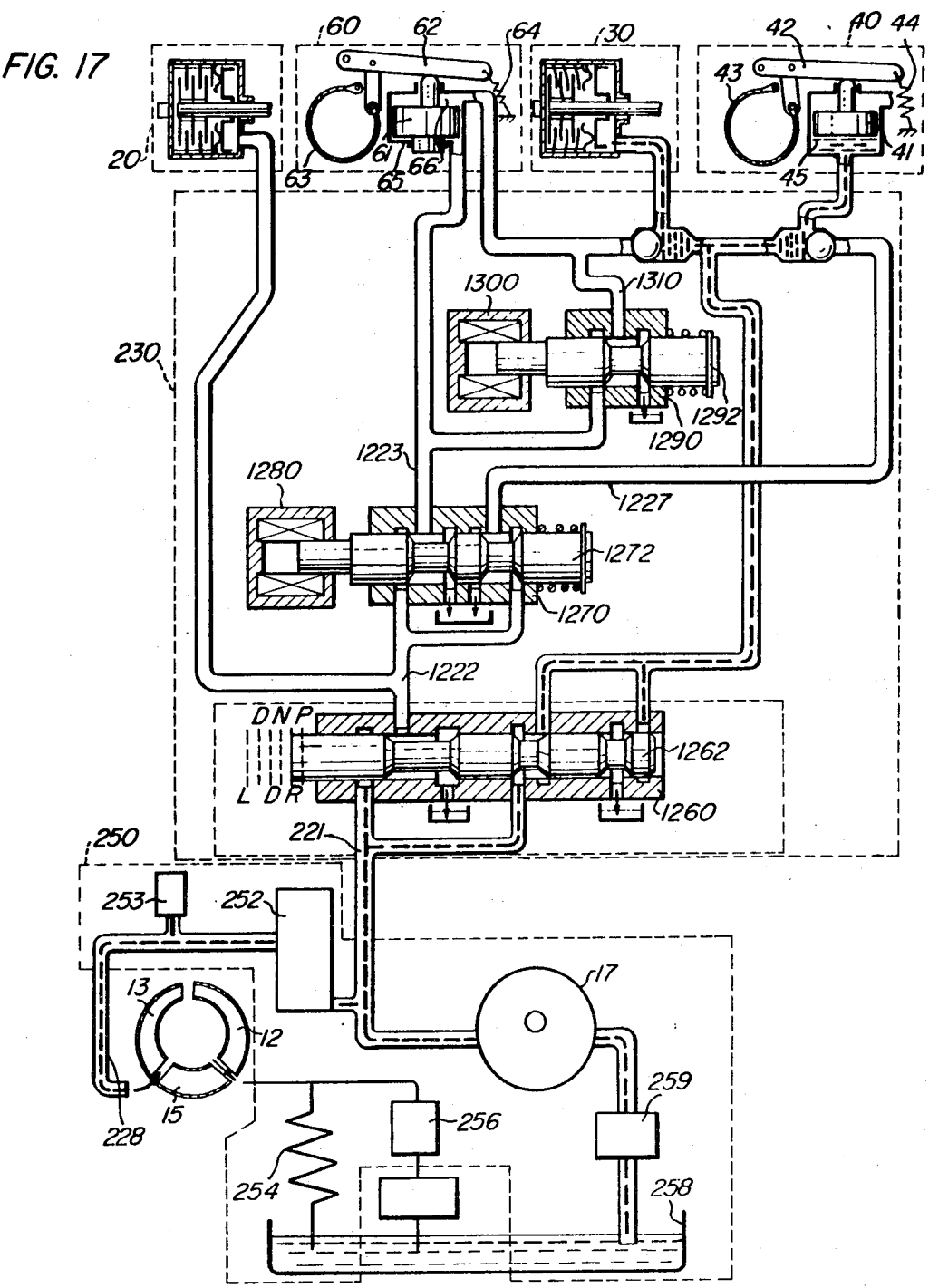

The hydraulic circuit for use with the transmission is shown in FIG. 17. In FIG. 17, the components of the system is shown in the Reverse stage (R) position. The front clutch 20, the rear clutch 30 and the rear brake 40 are identical to those shown in FIGS. 1 and 2, and the front brake 60 comprises a brake piston 61, a brake link 62, a brake band 63, a return spring 64 and a brake cylinder 65. By applying hydraulic pressure to the brake cylinder 65, the brake band 63 is actuated to hold fixedly the second sun gear 57 of the gear train 50.

In FIG. 17, the oil passage 221 leading to a manual control valve 1260 is branched into two passages. An oil passage 1222 from the manual control valve 1260 is divided into two passages, one of which is in communication with a first shift valve 1270. An oil passage 1223 from the first shift valve 1270 is divided into two passages, one of which communicates with the brake cylinder 65 and the other with a second shift valve 1290. An oil passage 1310 from the second shift valve 1290 communicates with the rear clutch 30 and the cylinder 66 of the front brake 60.

The shift valves 1270 and 1290 respectively have valve spools 1272 and 1292 provided with solenoids 1280 and 1300 respectively. The solenoids are operated as in the following table.

|  | Solenoid 1,280 | Solenoid 1,300 |
|---|---|---|
| 1st |  |  |
| 2nd | energize |  |
| 3rd | energize | energize |

When the solenoid 1280 is energized, the valve spool 1272 of the first shift valve 1270 is displaced toward left as seen in the drawing to connect the passages 1222 and 1223 together and, when de-energized, the valve spool is returned toward right to disconnect the passages 1222 and 1223 and connect the passages 1222 and 1227 together.

In the illustrated position, the second shift valve 1290 blocks the communication between the passages 1223 and 1310, however, when the solenoid 1300 is energized, the valve spool 1292 is displaced toward right to communicate the passages 1223 and 1310 together.

Further, by using a shift valve including a moving core which is rightwardly forced when energized and a spring which normally urges the valve stem leftwardly, three forward stages can be obtained through the energization of the solenoids 1280 and 1300 as shown in the following table.

|  | Solenoid 1,280 | Solenoid 1,300 |
|---|---|---|
| 1st | energize | energize |
| 2nd |  | energize |
| 3rd |  |  |

IX Advantages of the Invention:

The advantageous features of the present invention will be summarized as follows:

1. According to the present invention, since the apparatus is divided into a transmission having a torque converter, a hydraulic circuit and an operational circuit, the hydraulic circuit can be a simple actuator system excluding any signal operating system. Therefore, it can be simplified and is compact and easy to manufacture.

The electrical circuit may include semiconductors and may be integrated, so that it can be made compact and high accuracy and reliability can be obtained.

The transmission can be controlled only by providing, in addition to a commonly required hydraulic pump 17, small speed detectors 70, 80 and 90, so that it can be made compact.

The compact, high performance and highly reliable features are particularly useful to a vehicle, particularly to an automobile.

2. Since the slip ratio of the torque converter, the engine speed and the vehicle speed are detected by the electrical circuit to find out the shifting zone and determined the shifting point, the performance of the engine, the running condition of the vehicle and the performance of the torque converter can fully be taken into account to determine the shifting point. Thus, automatic shifting can be performed even when in an engine braking condition. Therefore, the shifting performance can remarkably be improved.

3. The connection between the transmission, the hydraulic circuit and the operational circuit can be made by simple means such as speed detectors as electromagnetic pick-up on rotating shafts or solenoids. Further, since the transmission, the hydraulic circuit and the operational circuit are composed of a solid mechanism, a fluid mechanism and an electrical mechanism respectively, there is no undesirable interference between them. Therefore, a stable operation can be obtained.

4. Since the hydraulic pressure source 250 can be a suitable constant pressure type, its structure can be simple and it can be stable and high performance.

5. The operational circuit can produce a stable shifting signal since it calculates the input signals in the form of logical product and logical sum.

6. According to the present invention, the shifting points (or lines) can easily be adjusted. For example, the automatic transmission of the present invention can readily be applied to various vehicles simply by adjusting the potentiometer to change the shifting points, so that less kinds of transmissions can broadly applied to a broad types of vehicle.

7. The operator of the vehicle can adjust the shifting points (or lines) in accordance with the usage of the vehicle, so that the transmission can be adapted for a broader usage.

8. Since the top speed of the engine is limited, any damage due to over speed of the engine can be prevented. Further, since the maximum speed of the transmission output shaft is limited, any trouble caused by the overspeed of the transmission can be prevented. Thus, the transmission in accordance with the present invention is durable and reliable, and is substantially free from undesirable trouble.

We claim:

1. An automatic transmission comprising
a transmission section including a torque converter having a torque converter pump connected to an input shaft and a torque converter turbine connected to an input shaft of a gear transmission mechanism having an output shaft and being shiftable as between at least higher and lower gear ratios;
friction engagement means for performing shifting as between said gear ratios in said transmission mechanism;
a manual control valve for controlling said transmission section;
a shift valve for controlling hydraulic fluid flow into and from said friction engagement means to cause said shifting;
a hydraulic circuit including said shift valve for controlling said friction engagement means;
first detecting means for producing electric output signals proportional to the rotational speed of the torque converter pump shaft;
second detecting means for producing electric output signals proportional to the rotational speed of the torque converter turbine;
third detecting means for producing electric output signals proportional to the rotational speed of the output shaft of said transmission section;
operational circuit means for developing up and down shift output signals by performing an operation on the output signals of said first and second and third detecting means; and
means for actuating the shift valve in said hydraulic circuit in accordance with the output signal of said operational circuit means to cause said shifting of said transmission mechanism to be from said higher gear ratio to said lower gear ratio upon the development of said down shift output signal by said operational circuit means and to be from said lower gear ratio to said higher gear ratio upon the development of said up shift output signal by said operational circuit means;
said operational circuit means including four slip ratio detecting circuits which each receive the output signals of said first and second detecting means to calculate the slip ratio between the torque converter pump shaft speed and the torque converter output shaft speed and produce respective output signals when the slip ratio reaches respective predetermined minimum and maximum values,
said operational means further including logical circuit means connected from the first and third detecting means and said slip ratio detecting circuits to said shift valve for:

A. developing the said down shift output signal when said torque converter pump shaft and said transmission section output shaft are each rotating at speeds below respective predetermined down shift speeds while either one of the output signals of two of the slip ratio detecting circuits is produced thereby upon reaching their respective predetermined minimum and maximum values and B. for developing the said up shift output signal when either the torque converter pump shaft speed or the transmission output speed exceeds respective given maximum values or only if the output signals of the other two slip ratio detecting circuits appear simultaneously while said torque converter pump shaft and said transmission section output shaft are each rotating at speeds above respective up shift speeds which respectively are lower than the said given maximum values 2. An automatic transmission comprising a transmission section including a torque converter having a torque converter pump connected to an input shaft and a torque converter turbine connected to an input shaft of a gear train transmission mechanism having an output shaft and being shiftable as between at least higher and lower gear ratios;
friction engagement means for performing shifting as between said gear ratios in said transmission mechanism;
a manual control valve for controlling said transmission section;
at least one shift valve for controlling hydraulic fluid flow into and from said friction engagement means to cause said shifting;
a hydraulic circuit including said shift valve for controlling said friction engagement means;
first rotational speed detecting means for producing electric output signals proportional to the rotational speed of the torque converter pump shaft;
second rotational speed detecting means for producing electric output signals proportional to the rotational speed of the torque converter turbine shaft;
third rotational speed detecting means for producing electric output signals proportional to the rotational speed of the output shaft of said transmission;
first rotational speed operational circuit for receiving the output signals from said first rotational speed detecting means as an input to calculate the rotational speed of the torque converter pump shaft;
second rotational speed operational circuit for receiving the output signals from the second rotational speed detecting means as an input to calculate the rotational speed of the torque converter turbine shaft;
third rotational speed operational circuit for receiving the output signals from said third rotational speed detecting means to calculate the rotational speed of the output shaft of said transmission;
first slip ratio detecting circuit for receiving the output signals from said first and second rotational speed operational circuits to calculate the slip ratio between the pump and the turbine of said torque converter and for producing a gear shift up signal when the slip ratio exceeds the lower limit slip ratio which is suitable for shifting the gear train up from a lower gear to a higher gear;

second slip ratio detecting circuit for receiving the output signals from said first and second rotational speed operational circuits to calculate the slip ratio between the pump and the turbine of said torque converter and for producing a gear shift down signal when the slip ratio becomes lower than the lower limit slip ratio which is suitable for shifting the gear train down from a higher gear to a lower gear;

third slip ratio detecting circuit for receiving the output signals from said first and second rotational speed operational circuits to calculate the slip ratio between the pump and the turbine of the torque converter and for producing a gear shift up signal when the slip ratio becomes lower than the upper limit slip ratio which is suitable for shifting the gear train up from a lower gear to a higher gear;

fourth slip ratio detecting circuit for receiving the output signals from said first and second rotational speed operational circuits to calculate the slip ratio between the pump and the turbine of the torque converter and for producing a gear shift down signal when the slip ratio exceeds the upper slip ratio limit which is suitable for shifting the gear train down from a higher gear to a lower gear;

a plurality of engine speed determining circuits for producing corresponding gear shift up and gear shift down signals when the output signals of said first rotational speed operational circuit come into a predetermined region corresponding to engine speed ranges suitable for shifting the gear train up from a lower gear to a higher gear and down from a higher gear to a lower gear respectively;

a plurality of vehicle speed determining circuits for producing gear shift up and gear shift down signals when the output signals of said third rotational speed operational circuit come into a predetermined region corresponding to vehicle speed ranges for shifting the gear train up from a lower gear to a higher gear and down from a higher gear to a lower gear respectively;

one each of said engine and vehicle speed determining circuits being operative to produce, as certain ones of said gear shift up signals, respective maximum speed shift up signals when respective predetermined maximum speeds requiring up shifting are exceeded;

one other each of said engine and vehicle speed determining circuits being operative to produce, as certain ones of said gear shift down signals, respective maximum speed shift down signals when engine and vehicle speeds respectively go below respective given maximum speeds for shifting down; and means, including a logical control circuit connected from each of said slip ratio detecting circuits and said engine and vehicle speed determining circuits to said shift valve for logically operating on all of said shift up and shift down signals, for controlling said shift valve to cause shift of said gear transmission mechanism into either A. a higher gear when either of the engine speed and vehicle speed determining circuits produces its said maximum speed shift up signal or only if both of said first and third slip ratio detecting circuits produce their said shift up signals concurrently with certain of said gear shift up signals respectively from the first mentioned engine and vehicle speed determining circuits, or B. into a lower gear when said maximum speed shift down signals are produced by both said engine and vehicle speed determining circuits concurrently with a shift down signal from either of said second or fourth slip ratio detecting circuits.

3. An automatic transmission in accordance with claim 2 wherein said first and second rotational speed detecting means are mounted on a housing of said torque converter in similar manners and each of them includes a rotational speed detector comprising a permanent magnet and a coil wound thereafound and a rotatable gear toothed disc disposed adjacent to said rotational speed detector.

4. An automatic transmission in accordance with claim 2 wherein said shift valve comprises a valve housing, a valve stem, a solenoid and a movable core, one end of said valve stem being connected with said movable core and the other end being subjected to a spring force to be urged in the direction opposite to that in which said movable core is displaced when the solenoid is energized, said valve stem being caused to move, when the solenoid is energized, against said spring force to open the oil passage which is connected to a pressurized oil supply when the solenoid is energized and connect another oil passage to the pressurized oil supply.

5. An automatic transmission in accordance with claim 2 wherein each of said rotational speed operational circuits comprises an amplifier circuit for amplifying the amplitude of the output signals of said rotational speed detecting means, an amplitude limiting circuit for limiting the amplitude of the output signal amplified by said amplifier to a constant value, and an AC-DC converter for converting the output signals of said amplitude limiting circuit to a direct current voltage proportional to the rotational speed.

6. An automatic transmission in accordance with claim 2 wherein each of said slip ratio detecting circuits comprises two potentiometers each having an intermediate slider with one end connected to an input terminal and the other end to a ground, and a differential amplifier having an input side connected with the intermediate sliders of said two potentiometers, said differential amplifier being operative to perform amplifying function only when the difference between the inputs are positive.

7. An automatic transmission in accordance with claim 2 wherein each of said speed determining circuit comprises a potentiometer having an intermediate slider with one end connected to an input terminal and the other end to the ground, a reference voltage generating circuit having an input side connected with said intermediate slider, and an amplifier, whereby an output is generated only when the input voltage is higher than the reference voltage from said reference voltage generating circuit.

8. An automatic transmission as in claim 2 wherein said logical control circuit includes:
   a bi-stable multivibrator having an output connected to said shift valve and having first and second inputs respectively for shift up and shift down signals,
   an OR circuit having an output connected to said first input of said multivibrator and having three inputs two of which respectively receive said maximum speed shift up signals,
   an AND circuit having an output connected to the third of said OR circuit inputs and having inputs for receiving shift up signals from the engine and vehicle determining circuits and first and third slip ratio detecting circuits,
   a second AND circuit having an output connected to by means said second input of said multivibrator and having three inputs two of which receive the said maximum speed shift down signals, and
   a second OR circuit having an output connected to the third input of said second AND circuit and having inputs receiving the shift down signals from the second and fourth slip ratio detecting circuits.

9. An automatic transmission as in claim 2 wherein the first mentioned said engine and vehicle speed determining circuits produce, as other certain gear shift up and down signals, respective minimum speed shift up signals when given respective minimum speeds for up shifting are exceeded and also produce minimum speed shift down signals when engine and vehicle speeds respectively go below respective predetermined minimum speeds requiring down shift and
   wherein the aforesaid paragraph A concurrent certain gear shift up signals from said engine and vehicle speed determining circuit are said minimum speed shift up signals produced thereby and
   wherein the aforesaid paragraph B shift into lower gear is accomplished by said controlling means also when either of said minimum speed shift down signals concurs with both of said maximum speed shift down signals.

10. An automatic transmission as in claim 9 wherein said logical control circuit includes:
    a bi-stable multivibrator having an output connected to said shift valve and having first and second inputs respectively for receiving shift up and shift down signals,
    an OR circuit having an output connected to said first input of said multivibrator and having three inputs two of which receive said maximum speed shift up signals,
    an AND circuit having an output connected to the third of said OR circuit inputs and having four inputs two of which receive said minimum speed shift up signals and the other two of which receive the shift up signals from said first and third detecting circuits,
    a second AND circuit having an output connected by means to said second input of said multivibrator and having three inputs two of which receive the said maximum speed shift down signals, and
    a second OR circuit having an output connected to the third input of said second AND circuit and having four inputs two of which receive the said minimum speed shift down signals and the other two of which receive the shift down signals from the second and fourth slip ratio detecting circuits.

11. An automatic transmission as in claim 10 and further including a third AND circuit for effecting the connection of said second AND circuit output to said second input of said multivibrator and synchronous timed holding circuit means connected between said multivibrator output and said first mentioned and third AND circuits for preventing a change in the input signals to said multivibrator for a given time following a change in the output signal thereof so as to prevent shifting before a previous shift is complete.

12. In an automatic transmission for use with an engine for a vehicle and of the type having a torque converter and gear means capable of being shifted from a lower gear to a higher gear and vice versa, the improvement comprising:
    means for developing an engine speed signal proportional to the speed of the engine,
    means for developing a vehicle speed signal proportional to the speed of the vehicle,
    means connected to said engine and vehicle speed developing means for producing respective maximum speed shift up signals when respective maximum speeds requiring up shifting are exceeded,
    means connected to said engine and vehicle speed developing means for producing respective maximum speed shift down signals when engine and vehicle speeds respectively go below respective given maximum speeds for shifting down,
    means including torque converter slip ratio detecting circuits connected to said engine and vehicle speed developing means for generating shift up and shift down signals based on the slip ratio exceeding and reducing below certain predetermined values, and
    logic circuit means connected to said generating means and to each of said producing means for causing shift into a higher gear when either of said maximum speed shift signals is present or when in the presence of certain shift up signals including those from said generating means and for causing shift into a lower gear when both of said maximum speed shift down signals concur with another shift down signal from said generating means.

* * * * *